United States Patent
Huizenga et al.

(10) Patent No.: US 8,495,064 B2
(45) Date of Patent: Jul. 23, 2013

(54) MANAGEMENT OF METADATA FOR LIFE CYCLE ASSESSMENT DATA

(75) Inventors: Neil Gregory Huizenga, Bellevue, WA (US); Daniel Christian Brown, Bellevue, WA (US); Michael Victor Ehrenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/228,421

(22) Filed: Sep. 8, 2011

(65) Prior Publication Data

US 2013/0066867 A1  Mar. 14, 2013

(51) Int. Cl.
G06F 7/00 (2006.01)
G06F 17/30 (2006.01)

(52) U.S. Cl.
USPC ............................ 707/736; 707/755; 707/758

(58) Field of Classification Search
USPC .................. 707/705, 736, 737, 738, 755, 758
See application file for complete search history.

(56) References Cited

U.S. PATENT DOCUMENTS

| | | | |
|---|---|---|---|
| 5,768,129 A | 6/1998 | Miyamoto | |
| 6,490,569 B1 * | 12/2002 | Grune et al. | 705/400 |
| 6,760,721 B1 | 7/2004 | Chasen et al. | 703/3 |
| 7,092,898 B1 | 8/2006 | Mattick et al. | |
| 7,412,365 B2 | 8/2008 | Kobayashi et al. | |
| 7,613,752 B2 | 11/2009 | Prahlad et al. | 707/204 |
| 7,672,962 B2 | 3/2010 | Arrouye et al. | 707/101 |
| 7,707,085 B2 | 4/2010 | Sakurai et al. | |
| 8,078,599 B2 * | 12/2011 | Kimura | 707/705 |
| 2002/0099587 A1 | 7/2002 | Kakihana et al. | |
| 2003/0069795 A1 | 4/2003 | Boyd et al. | |
| 2004/0122869 A1 | 6/2004 | Muehl et al. | |
| 2007/0112748 A1 | 5/2007 | Angell et al. | |
| 2007/0185691 A1 | 8/2007 | Kimura | |
| 2008/0059457 A1 | 3/2008 | Ohnemus et al. | |
| 2008/0215601 A1 | 9/2008 | Seki | |
| 2008/0319812 A1 | 12/2008 | Sousa et al. | |
| 2009/0099879 A1 | 4/2009 | Ouimet | |
| 2009/0328051 A1 | 12/2009 | Maes | 718/104 |
| 2010/0030601 A1 * | 2/2010 | Warther et al. | 705/7 |
| 2010/0042978 A1 | 2/2010 | Bird et al. | 717/128 |

(Continued)

OTHER PUBLICATIONS

Title: Life-Cycle Assessment: Inventory Guidelines and Principles; Date: Feb. 1993; pp. 1-6; Published by: Battelle. and Franklin Associates, Ltd.*

(Continued)

*Primary Examiner* — Usmaan Saeed
*Assistant Examiner* — Md. I Uddin
(74) *Attorney, Agent, or Firm* — Merchant & Gould

(57) ABSTRACT

Management of metadata applied to life cycle inventory (LCI) and life cycle assessment (LCA) data is provided. Life cycle inventory data may be provided through a secure framework to a data hub where it may be validated and audited and where the received life cycle inventory data may ultimately be used to generate a life cycle assessment score for a given product. Life cycle inventory data may be provided via a structured data template provided by a supplier or obtained by a supplier via a requested unit business process model. Metadata may be applied to each LCI data item to allow the data items to be stored, sorted, search, retrieved and used for validating and auditing the data and for comparing the data to other data items of similar data types for eventual use in the generation of the aforementioned life cycle assessment score for a given product.

20 Claims, 12 Drawing Sheets

U.S. PATENT DOCUMENTS

| | | | |
|---|---|---|---|
| 2011/0082820 A1 | 4/2011 | Shah et al. | |
| 2011/0093420 A1 | 4/2011 | Rothenberg et al. | |
| 2011/0313751 A1 | 12/2011 | Betzler et al. | |
| 2012/0123953 A1* | 5/2012 | Jabara | 705/317 |
| 2012/0123961 A1* | 5/2012 | Dunning | 705/347 |
| 2013/0066672 A1 | 3/2013 | Brown et al. | |
| 2013/0066752 A1 | 3/2013 | Huizenga et al. | |
| 2013/0066897 A1 | 3/2013 | Ehrenberg et al. | |

OTHER PUBLICATIONS

Title: Life Cycle Inventory Analysis; Author:Dr B V Babu; Date: Dec. 4-5, 2006; pp. 1-5.*

Adaptive Metadata Manager™, http://www.adaptive.com/products/mm.html, 4 pages (May 13, 2007).

Huang, I-A. et al., "Extracting Citation Metadata from Online Publication Lists Using BLAST," http://www.iis.sinica.edu.tw/papers/hoho/1573-F.pdf, 10 pages (2004).

Jun, H-B. et al., "Product Life-Cycle Metadata Modeling and Its Application with RDF," *IEEE Transactions on Knowledge and Data Engineering*, vol. 19, No. 12, pp. 1680-1693 (Dec. 2007).

Metadata Management: An Essential Ingredient for Information Lifecycle Management, http://www.sun.com/storage/white-papers/Metadata_Management.pdf, 10 pages (Oct. 2005).

Metadata-Driven Data Integration, Ensuring Enterprise-wide Visibility and Transparency with Metadata Management, http://www.informatica.com/INFA_Resources/wp_metadata_di_6687_web.pdf, 16 pages (Jan. 2007).

Office Action mailed Jul. 3, 2012, in co-pending U.S. Appl. No. 13/228,327.

Office Action mailed Sep. 28, 2012, in co-pending U.S. Appl. No. 13/228,381.

Office Action mailed Jul. 18, 2012, in co-pending U.S. Appl. No. 13/228,405.

Carlson, R. et al., "Data Model for Product Related Environmental Assessment," Systems engineering models for waste management, International Workshop in Goteborg, Sweden, http://www.entek.chalmers.se/~josu/artraca. htm, 7 pages (Feb. 25-26, 1998).

Critical review of current research needs and limitations related to ISO-LCA practice, Co-ordination Action for innovation in Life-Cycle Analysis of Sustainability, Project No. 037075, http://www.leidenuniv.nl/cml/ssp/publications/calcas_report_d7_annex_1.pdf, 57 pages (Jul. 2008).

Life Cycle Assessment (LCA) and Life Cycle Cost (LCC) Tool for Commercial Building Development in Hong Kong,http://www.emsd.gov.hk/emsd/e_download/pee/lceabc_lcaleaflet_final.pdf, 2 pages (Retrieved Apr. 15, 2010).

Nebel, B. et al., Life Cycle Inventory—Review of data collection protocols, http://www.med.govt.nz/upload/70622/ecov-lci-review.PDF, 94 pages (Jul. 2009).

Weidema, B. et al., "Procedural guideline for collection, treatment, and quality documentation of LCA data," http://www.enea.it/produzione_scientifica/pdf_volumi/V2004_ProceduralLCA.pdf, 72 pages (2004).

Tgloria, OpenLCA, http://www.life-cycle.org/?p=247, 3 pages (Nov. 19, 2009).

Life-Cycle Assessment for Buildings: Seeking the Holy Grail, Environmental Building News, http://www.buildinggreen.com/auth/article.cfm/2002/3/1/Life-Cycle-Assessment-for-Buildings-Seeking-the-Holy-Grail/, 8 pages (Mar. 1, 2002).

Hicks, Life Cycle Thinking: Key Issues and Indispensable Tools, http://www.core77.com/blog/featured_items/life_cycle_thinking_key_issues_and_indispensable_tools_by_lloyd_hicks_16082.asp, 14 pages (Mar. 4, 2010).

EcoSpold v2 Data Format, Econvent Centre, Swiss Centre for Life Cycle Inventories, http://www.ecoinvent.org/database/ecospold-data-format/ecospold-v2/, 3 pages (Retrieved Apr. 15, 2010).

International Reference Life Cycle Data System (ILCD), http://www.fp7.org.tr/tubitak_content_files//270/ILCD_About_the_International_Reference_Life_Cycle_Data_System_ILCD_May2008.pdf, 8 pages (May 20, 2008).

Logaras, "Life Cycle Inventory Data Collection for First Tier Suppliers—A Case Study of a Bearing Unit," Master of Science Thesis, Chalmers University of Technology, Goteborg, Sweden, http://www.chalmers.se/ee/SV/forskning/forskargrupper/miljosystemanalys/publikationer/ee/SV/forskning/forskargrupper/miljosystemanalys/publikationer/pdf-filer/2008/downloadFile/attachedFile_8_f0/2008-11?nocache=1222947630.85, 94 pages (2008).

U.S. Department of Energy, Energy Efficiency & Renewable Energy, U.S. Life Cycle Inventory Database Roadmap, http://www.nrel.gov/docs/fy09osti/45153.pdf, 12 pages (Aug. 2009).

Weidema, B.P. et al., "Agricultural data for Life Cycle Assessments," Agricultural Economics Research Institute, The Hague, http://www.lcacenter.org/library/pdf/2_00_01_1.pdf, 208 pages (Feb. 2000).

British Standards Institution, Guide to PAS 2050, Nov. 13, 2008, (5, 15, 17, 18, 34, 37).

Cisco, 2009 User Guide for the Cisco Secure Access Control Systems 5.1, (A-07; B-13; B-27; B-28).

Tool SimaPro 7, European Commission, http://lca.jrc.ec.europa.eu/lcainfohub/tool2.vm?tid=216, 5 pages (Jun. 25, 2009).

Office Action mailed Feb. 14, 2013, in co-pending U.S. Appl. No. 13/228,381.

Office Action mailed Feb. 27, 2013, in co-pending U.S. Appl. No. 13/228,327.

Office Action mailed Feb. 28, 2013, in co-pending U.S. Appl. No. 13/228,405.

* cited by examiner

MANAGEMENT OF METADATA FOR LIFE CYCLE ASSESSMENT DATA

BACKGROUND

In the global economy, concerns about environmental and social responsibility in product manufacturing, distribution and use are driving the need to provide information about products to consumers at all phases of a product's life cycle (from growth/manufacturing to disposal) to allow consumers to know whether a given product was produced or used in a responsible manner or to allow consumers to know the environmental and/or social impact of a given product for comparing the product against other products. For example, a purchaser of an article of clothing may believe the article of clothing was manufactured in an environmentally and socially responsible manner, but in reality, a portion of the manufacturing life cycle, for example, cotton growth, may have been produced using a variety of fertilizers and pesticides the purchaser may find unacceptable. Moreover, the cotton may have been harvested in a manner that did not meet acceptable labor standards (for example, use of child labor). Persons or entities desiring such information may exist at all phases of production or use, for example, down stream component purchasers, retailers, end users, or even disposers of a depleted or used product.

Management of data at all phases of a product's life cycle in a manner that ensures reliability and security of the data, as well as, anonymity (if required) of the provider of the data is often difficult to achieve. For any given product, a multitude of data items may be relevant to the product's life cycle in association with all the components and/or processes employed in the creation, use and eventual disposal of the product. For example, for even a single component of a given product, those responsible for the product may need to track a multitude of data items, for example, component date, component quality, component environmental and safety issues, and the like.

It is with respect to these and other considerations that the present invention has been made.

SUMMARY

Embodiments of the present invention solve the above and other problems by providing for management of metadata applied to life cycle inventory (LCI) and life cycle assessment (LCA) data. Suppliers of goods and/or services may provide life cycle inventory data through a secure framework to a life cycle inventory and assessment data hub where the life cycle inventory data may be validated and audited and where the received life cycle inventory data may ultimately be used to generate a life cycle assessment score for a given product. Life cycle inventory data may be provided via a structured data (e.g., XML-based structured data) template provided by a supplier or obtained by a supplier via a requested unit process model. Metadata may be applied to each LCI data item to allow the data items to be stored, sorted, search, retrieved and used for validating and auditing the data and for comparing the data to other data items of similar data types for eventual use in the generation of the aforementioned life cycle assessment score for a given product.

The details of one or more embodiments are set forth in the accompanying drawings and descriptions below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
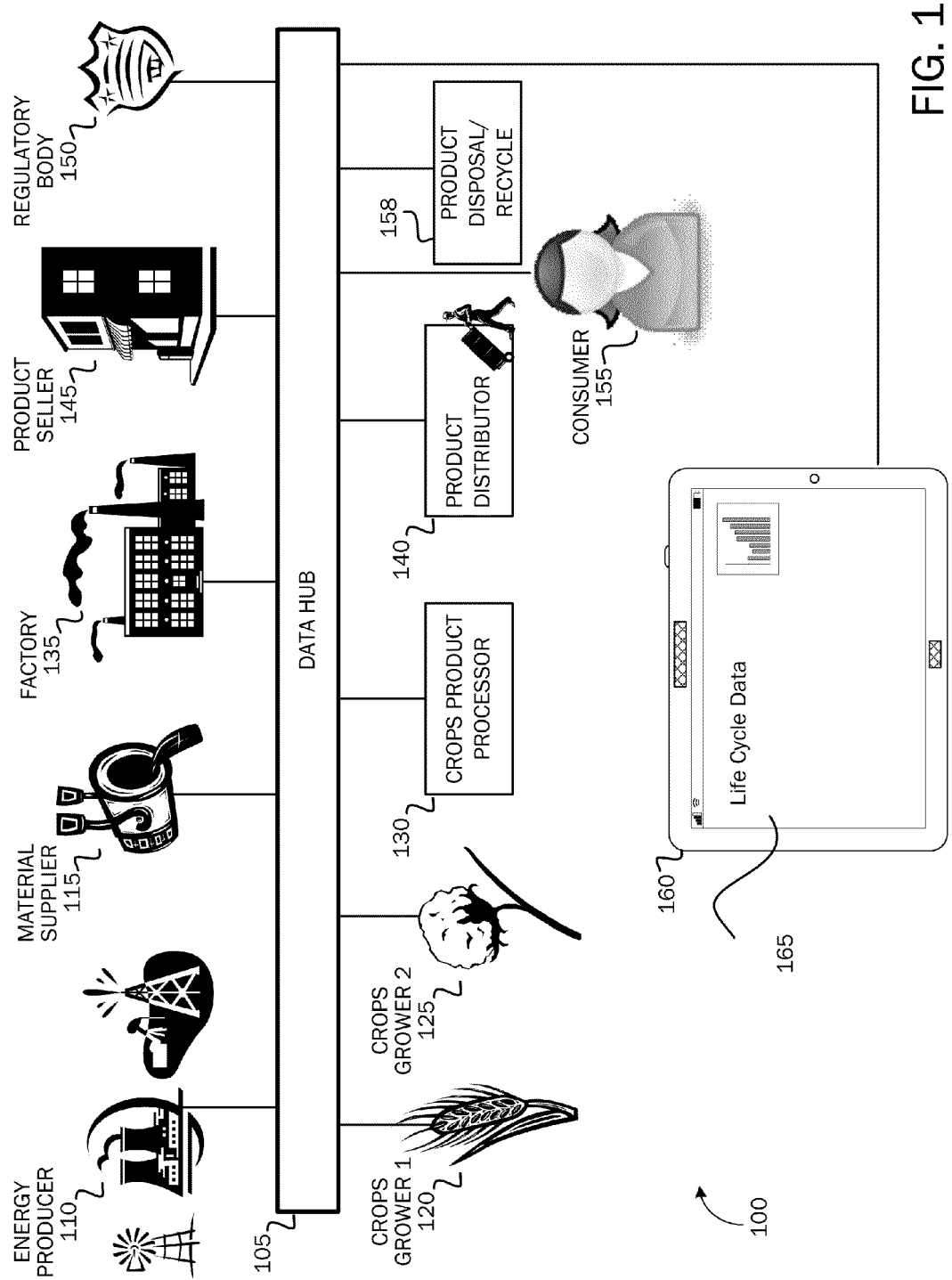
FIG. 1 is a simplified block diagram illustrating a life cycle of one or more goods and/or services from production through consumption and/or disposal.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to management of metadata applied to life cycle inventory (LCI) and life cycle assessment (LCA) data. Suppliers of goods and/or services may provide life cycle inventory data through a secure framework to a life cycle inventory and assessment data hub where the life cycle inventory data may be validated and audited and where the received life cycle inventory data may ultimately be used to generate a life cycle assessment score for a given product. When life cycle inventory information is provided by a supplier of goods and/or services, the supplier may provide detailed information about each phase of development, production, use, and/or disposal of a given good or service, for example, an article of clothing.

Detailed information provided by the supplier may include materials used in the manufacture or operation of a good and/or service, energy used, transportation used, distribution systems used, sales systems used, and the like. Each phase, in turn, may include a variety of components, for example, fuels, other energy sources, individual material items, information about transportation systems, and the like. For each component or subcomponent of a given product, a variety of data may be provided by the supplier. For example, for a fuel used by a crops grower to grow cotton that will eventually be used in the manufacture of a cotton shirt, data about the fuel used by the crops grower may include date of purchase of the fuel, fuel type (e.g. diesel versus gasoline), fuel supplier, amounts of fuel used, duration over which amounts of fuel are used, regulatory codes or requirements associated with the fuels, and the like.

As will be described below, sophisticated suppliers and providers of such information may use a structured data template for providing such information, and the structured data template may allow for application of metadata to each data item associated with the provided information for identifying each data item. Unsophisticated providers of information may utilize a requested unit process model for obtaining a template or for providing such data, and metadata may subsequently be applied to each provided data item. For example, if a crops grower supplies information about the date of purchase of fuel for farm machinery, the type of fuel purchased, the amounts of fuel used, and the like, metadata may be applied to each such data item so that each data item may be identified and stored with other similar types of data items for subsequent searching, retrieval, and use in the generation of a life cycle assessment score for a given product.

For example, if a crops grower provides data about fuels used in the production of cotton, metadata associated with fuels may be stored with other information on other fuels. Likewise, metadata associated with fertilizers used in the production of the cotton crop may be stored with information associated with other fertilizers, metadata associated with pesticides used by the example crops grower may be stored with information associated with other pesticides, and the like. Thus, when the crops grower or another user of such items requires a life cycle assessment for a given product, for example, a bale of cotton, life cycle inventory information for each component or process involved in the production of the product may be searched via the metadata associated with life cycle inventory data for each component and/or process, and the retrieved data may be utilized for generating a life cycle assessment score for the product (e.g., a bale of cotton).

According to embodiments, life cycle inventory (LCI) data associated with each component or process involved in the manufacture, use and disposal of a good, or in the development and provision of a service may be collected for ultimately developing a life cycle assessment (LCA) for a given good or service to allow persons or entities engaged in the development, manufacture, distribution, use or disposal of goods or services to operate in an informative manner with respect to the life cycle of the goods or services. According to embodiments, each supplier of a good or service or each supplier of a component of a good or service (hereinafter collectively referred to as "product") for which LCI data is desired or required provides a unit process data set for their respective products. The unit process data set includes data on all components or processes utilized by the supplier in the manufacturing, development, delivery, use or disposal of their respective products, including, energy, raw materials, processing methods, components of and information about use, components of and information about disposal, and the like.

Providing unit process data for a given product may be performed according to a variety of methods. First cradle-to-gate or cradle-to-grave life cycle inventory data may be provided via a structured data template for organizing the data according to a prescribed structure required for processing the data. Second, the LCI data may be provided as raw data via a generic unit process model requested by the data supplier. Alternatively, a combination of structured data and raw data may be provided by a given supplier.

As will be described below, data provided by a given supplier may be passed through a distributed computing network, for example, the Internet or an intranet, to a life cycle inventory and assessment data hub where the data may be validated and/or audited, and where the data may be aggregated and scored in terms of its environmental and/or social impact with reference to the product for which the data is collected. The environmental and/or social scoring may be used by consumers of the product in determining the environmental and/or social impact associated with their consumption of the product whether their consumption is end use, or whether their consumption is involved in using the product in the development, manufacturing, use and/or disposal of one or more other goods and/or services.

For purposes of illustration, one or more examples will be described below. While a given example may apply more to environmental impact, such as the use of water, fuels, and chemicals, social impact is equally important where the social impact of the creation and/or use of a product may be of substantial importance. For example, if a given product is manufactured under inappropriate labor standards, such information may be quite useful in scoring a given product and in providing such information to potential consumers of the product.

FIG. 1 is a simplified block diagram illustrating a life cycle of one or more goods and/or services from production through consumption. The components and processes illustrated in FIG. 1 are illustrative of a variety of suppliers of one or more products where such products may be in the form of components and/or services provided for and/or utilized in association with the development, production, use and/or disposal of one or more products. For example, referring to FIG. 1, an energy producer 110 is illustrative of a fossil fuels-based energy production provider, a solar or hydroelectric power energy provider, a nuclear-based energy provider, and the like. A material supplier 115 is illustrative of a manufacturer or supplier of a variety of materials, for example, raw materials, chemicals, natural and human-made materials, equipment, and the like. For example, the material supplier 115 may be a supplier of fertilizers or pesticides used in the production of crops. Likewise, the material supplier 115 may be a supplier of an intermediate component, for example, a manufactured component that it used in some other product or service.

The crop grower 120 and the crop grower 125 may be illustrative of one or more suppliers of natural materials, for example, crops, timber, mined ores, and the like. The crops product processor 130 is illustrative of a factory or processing unit responsible for transforming a raw material from one state to another. For example, the crops product processor 130 may be a manufacturing concern operative to transform raw cotton into cotton yarn or thread that may be utilized in the production of an article of clothing. The factory 135 is illustrative of a factory for processing one or more supplied materials into a useful intermediate or end-user product. The product distributor 140 is illustrative of one or more distribution systems, transportation systems, communication systems, warehousing or storage systems, involved in the processing, storage, delivery and/or utilization of one or more products.

The product seller 145 is illustrative of any organization operative to sell one or more intermediate or end-user products. A regulatory body 150 is illustrative of any organization tasked with overseeing, managing or regulating the development, manufacture, use or disposal of a product. A consumer 155 is illustrative of any intermediate user or end user of a product. For example, any of the entities 110-150 may indeed be a consumer of products, as described herein.

The disposal/recycle unit 158 is illustrative of a number of processes that may be applied to a given product at the end of its useful life. For example, a product may be disposed of in a landfill or other disposal site, a product may be incinerated, and the like. All of such disposal methods may be associated with a number of environmental and social impacts. In addition, the disposal/recycle unit 158 may be illustrative of recycling processes or reuse processes where products or components of products may be recycled for subsequent use or where products may be reused in their current or altered forms.

As will be described below with reference to FIGS. 2A, 2B, the life cycle inventory and assessment data hub 105 is illustrative of one or more computing components and data repositories to which life cycle inventory data may be passed for organization, validation and/or auditing, aggregation, storage, and release to one or more users of the life cycle inventory data. The computing device 160 is illustrative of any computing device, described below with reference to FIGS. 8, 9A, 9B and 10 with which life cycle inventory and life cycle assessment data may be presented, processed, accessed and released, as described herein. The display screen 165 on the computing device 160 is illustrative of a computer-enabled display screen on which may be displayed one or more life cycle inventory and/or life cycle assessment data items, as described herein.

According to embodiments, each of the components of the system architecture illustrated in FIG. 1 may operate as standalone components that are operatively connected with the data hub 105 for providing and receiving life cycle inventory and life cycle assessment data in association with their respective products. That is, each of the supplier entities 110-155 may be independent operating entities located at disparate locations around the world and that are operative for providing their respective products as intermediate or end-user products. The data hub 105, and its components, described below with reference to FIGS. 2A, 2B, may operate as a collection of computing devices and data storage repositories at a single location, or the components of the data hub 105 may be operated as a distributed computing network where one or more of the components of the data hub 105 may be located at disparate locations relative to other components of the data hub 105, all of which may be connected via a distributed computing network, such as the Internet or an intranet.

As will be described herein, each supplier in a given product life cycle may submit life cycle inventory data on his/her products through the data hub 105, and the life cycle inventory data for all products associated with or combined as part of the life cycle of a given product may be aggregated for a scoring of individual products and for ultimate products into which individual products are combined or with which individual products are utilized. For example, consider that the suppliers illustrated in FIG. 1 are associated with the manufacturing of a shirt or other article of clothing. According to an embodiment, the energy producer 110 may provide life cycle inventory data associated with all components required for the production of energy, a crop grower 120, 125 may provide life cycle inventory data associated with all aspects of crops production, for example, fertilizers, pesticides, fuels, labor, and the like associated with growing cotton, the factory 135 may supply data associated with manufacturing processes required for transforming cotton thread or yarn into fabric with which a shirt or other article of clothing may be made, the distributor 140 may submit life cycle inventory data associated with all aspects of distribution of a manufactured shirt or other article of clothing, for example, fuel types and usage data, warehousing capacities, utilization, heating and cooling statistics, and so on.

According to embodiments, the life cycle inventory data submitted by each supplier may be used for generating an environmental and/or social impact score for that product, and ultimately the environmental and/or social impact scores associated with each intermediate component, for example, energy, crops production, manufacturing, storage, distribution, and the like, may be aggregated together to generate an environmental and/or social impact score for an end product, for example, a shirt or other article of clothing. The environmental scoring generated from the life cycle inventory data provided by each supplier may then be used by each supplier to determine which intermediate component the supplier desires to use in their products. Downstream users of an end-user product may utilize the life cycle assessment scoring generated from the life cycle inventory data provided by each supplier to determine whether the users desire to use a given product as opposed to another product based on the life cycle assessment scoring for two competing products.

Figure 2A:
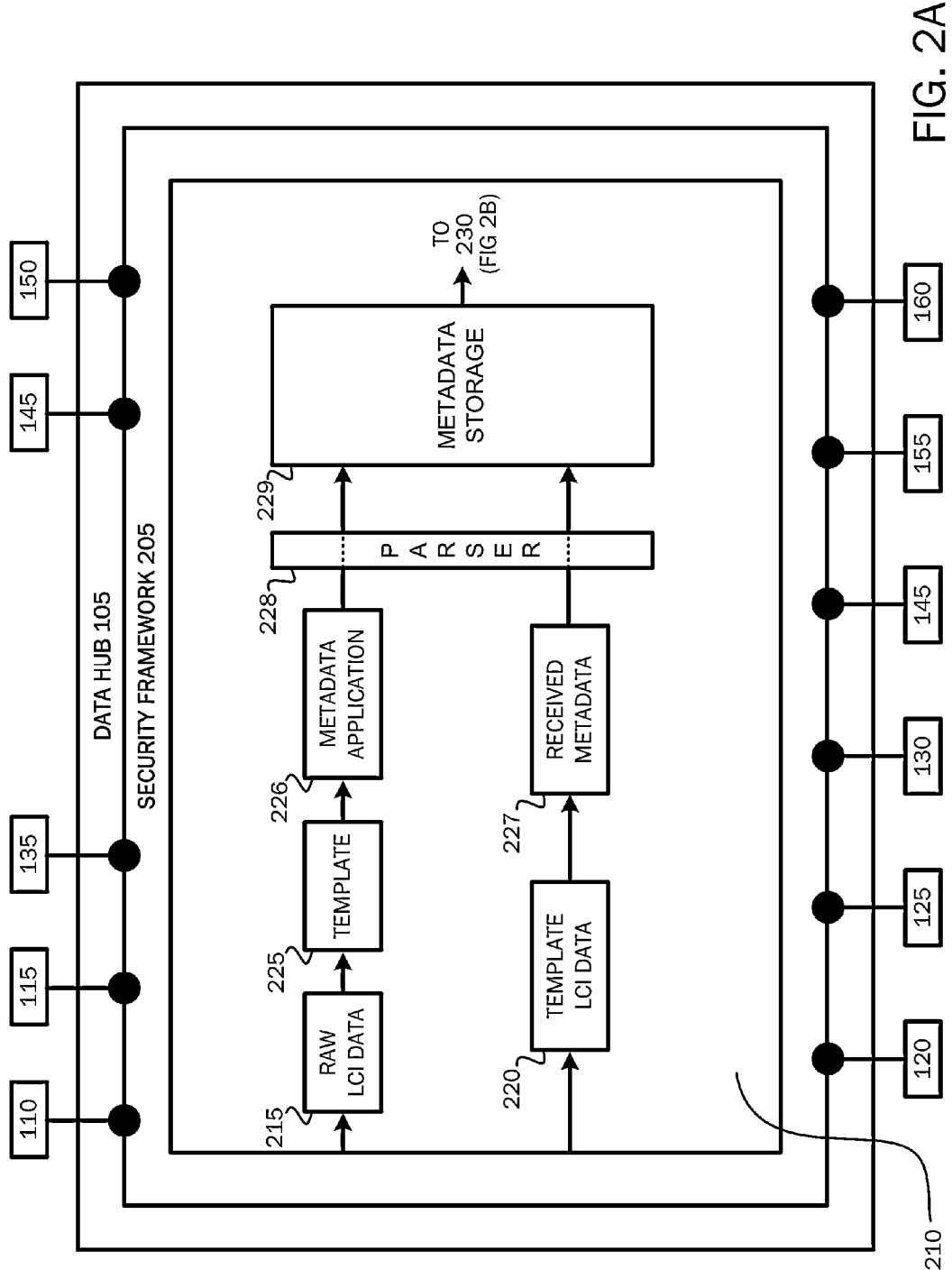
FIGS. 2A and 2B are simplified block diagrams of a data hub for receiving and processing life cycle inventory data.
Figure 2B:
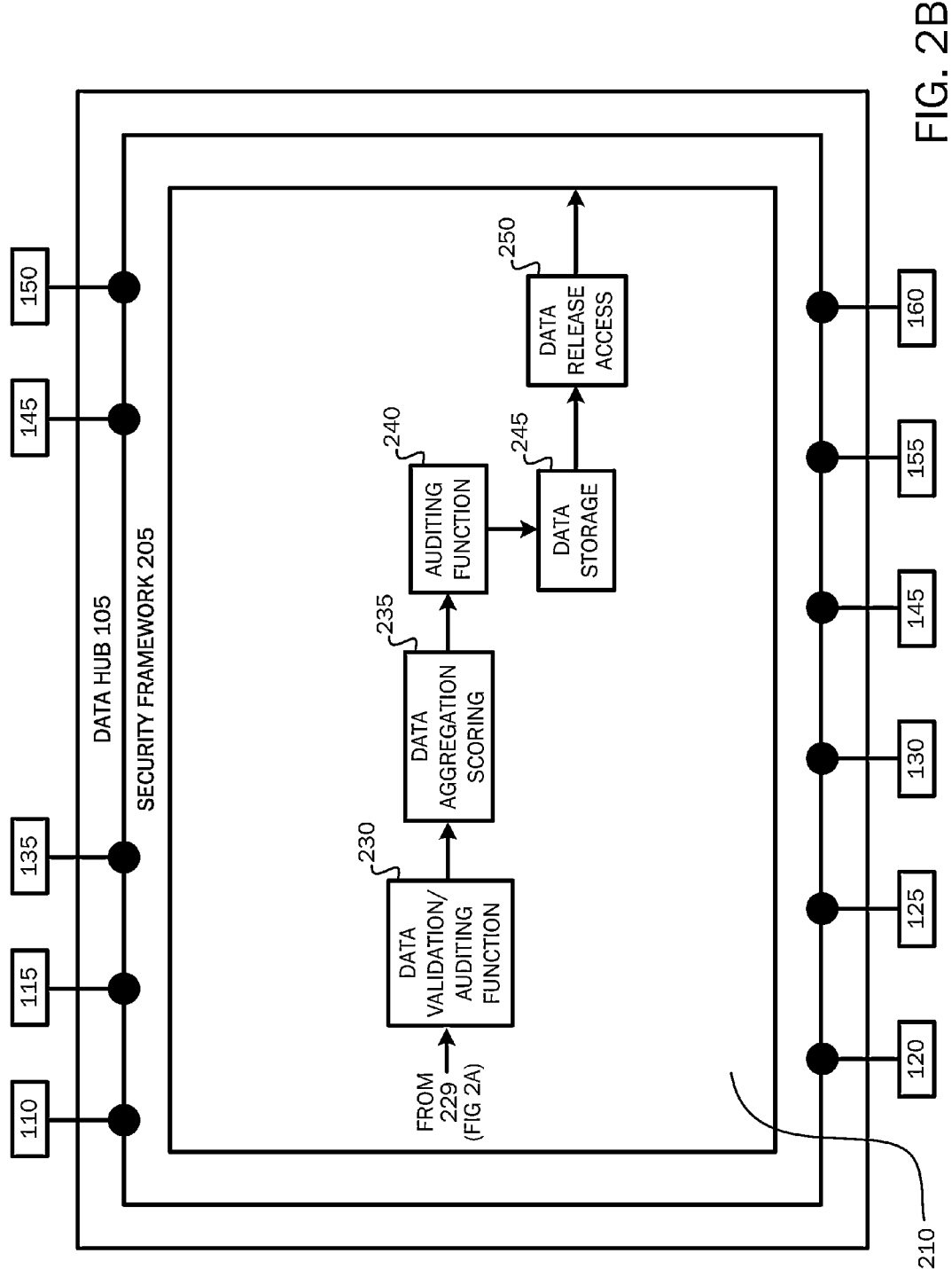

Referring now to FIGS. 2A, 2B, one or more components and/or systems comprising and interacting with the life cycle inventory (LCI) and life cycle assessment (LCA) data hub 105 are illustrated and described. As described above, the data hub 105 includes a number of computing systems and/or data storage repositories operative to receive and process life cycle inventory data associated with a variety of intermediate and/or end-user products including information about components and/or processes involved in the development, manufacture, use and disposal of one or more intermediate or end-user products.

Figure 4:
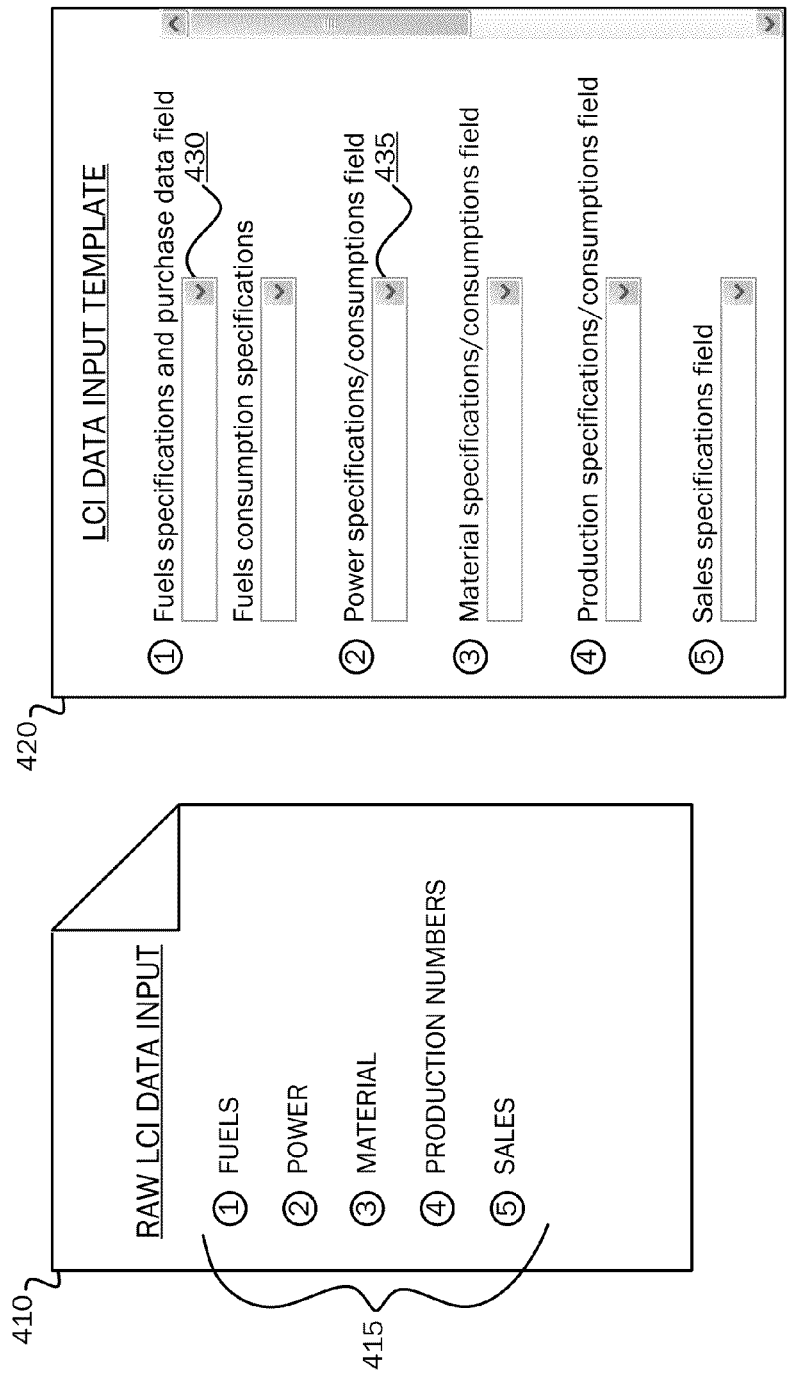
FIG. 4 is a simplified block diagram showing two data input documents.

A security framework 205, described below with reference to FIG. 4, is operatively positioned between suppliers 110-155 and the data hub 105 in order to provide secure access to the data hub 105 and in order to prevent unauthorized or unsecured access to the data hub 105. As should be appreciated, life cycle inventory and life cycle assessment information for various products (both intermediate and end-user products) may be highly sensitive information having a great impact on the competitive positions of one supplier versus another supplier, and consequently, information obtained from various suppliers must be secured from access by other suppliers to allow suppliers the comfort of knowing they can provide life cycle inventory information on their products and services without being concerned that that information may be exposed to other suppliers which may allow other suppliers to be aware of competitive advantages/disadvantages associated with their products. Such concerns on the part of a given supplier of LCI and LCA information may discourage or prevent the sharing of valuable life cycle inventory information, as described herein, if the sharing of such information cannot be done in a secure manner.

According to embodiments, an individual supplier 110-155 may submit life cycle inventory data, for example, fuel usage, energy usage, raw material usage, raw material processing data, transportation information, and the like, through a variety of means. According to one method, a supplier may submit raw business or business transaction data 215 to the data hub 105 for automated processing by the data hub 105. As used herein, raw business or business transaction data may include any data a supplier may have on processes or materials used by the supplier in the manufacture or use of a given product, but for which the supplier cannot provide life cycle inventory data in a structured manner, as will be described herein. Examples of such raw business or business transaction data include purchase data, sales data, amounts of processes or materials used, and the like. As described herein, such raw business and business transaction data ultimately may be converted into LCI data. For example, if the supplier lacks equipment, personnel, or otherwise, lacks the technical sophistication for presenting life cycle inventory in a structured manner, as described below, raw business or business transaction data may be presented by the supplier. For example, if the crops grower supplier 120 is in the business of growing cotton for use in the manufacture of clothing items, the crops grower may not have equipment, personnel, or access to technical means for presenting his/her life cycle inventory data in a structured manner, as described below. Thus, the crops grower may submit raw business or business transaction data 215 to the data hub 105.

For the example crops grower, such raw business or business transaction data may include amounts and types of fuel usage for farming equipment, amounts and types of fertilizers and pesticides used, amounts of labor used, including, information about labor-providing personnel, amounts of crops produced, durations of crops production, and the like. If the supplier has additional information about each life cycle inventory data item, for example, material safety data sheets associated with chemicals, for example, pesticides and fertilizers, brand names associated with fuels or other energy sources, purchase orders providing data associated with various raw materials used in the supplier's processes, and the like, such information may be provided with the raw business or business transaction data for assisting in structuring, validating and auditing the information received from the supplier.

If raw business or business transaction data is provided by a supplier, the received data may be automatically populated into a template 225 received via a generic unit process model, as described below with reference to FIG. 4, for providing data structuring to each received data item so that structured data items received by the supplier may be used by one or more computing processes described herein for validating and auditing the information, for aggregating and scoring the information, and for ultimately storing and releasing the information to other requesting suppliers.

According to one embodiment, such a supplier desiring to submit raw business or business transaction data may request via the data hub 105 a generic unit process model from the data hub 105 to allow the supplier to provide raw business or business transaction data. Such a model provided by the data hub 105 may be based on a product category rule (PCR) that applies to the supplier's product. For example, if the supplier's product is raw cotton, then a data model based on a product category rule applied to other suppliers of raw cotton may be presented to the supplier to assist the supplier in providing the raw business or business transaction data in a manner such that the data may ultimately be structured via the template 225 for use by the processing components of the data hub 105.

The product category rule-based model may be defined by one or more standards bodies, for example, the International Organization for Standardization (ISO). The product category rule-based model may be utilized and may be provided by comparing the finished products categorization (e.g., finished product being raw cotton, or finished product being one or more end products including raw cotton) with that of the product category rule to be applied to the example raw cotton. Once the supplier receives the unit process model, the supplier may then complete a template associated with unit process model with required information. For example, a unit process model for the production of raw cotton may provide a template 225 having fields to allow a supplier to enter data, as described above, such as fuel types and usages, pesticide and fertilizer types and usages, labor usage, production quantities, production durations, and the like. The data provided via the unit process model may include, but is not limited to, purchase orders, invoices, sales information, production locations, vendor information, customer information, descriptions of technologies used, and the like. Such information may allow for validation and auditing and ultimate scoring of the data, for example, where a technology used by one supplier has a greater environmental or social impact than a technology used by another supplier. For example, the use of human labor versus the use of mechanized production may impact both the environmental and social scorings applied to a given product. Use of the unit process model may allow for the data provided by the supplier to be compared with other similarly situated or types of data to allow for data validation and auditing via the data hub 105.

Alternatively, referring still to the data hub 105, a given supplier 110-155 may provide life cycle inventory data in a structured manner via a template 220 with which the supplier submits complete life cycle inventory data that the supplier collects, annotates, and organizes using one or more business data systems, direct measurement, databases, and research. For example, if a supplier is a highly sophisticated organization in the business of manufacturing a chemical that may be a down range component or constituent of an end-user product, such a supplier may possess or be associated with laboratories, accounting functions, manufacturing and data measurement functions, and the like to allow the supplier to collect detailed life cycle inventory data and to organize the collected data into one or more sets of collected data for provision to the data hub 105 via a template 220. For example, such a supplier may be fully capable of measuring and documenting energy consumption associated with the production of a given product or component, the supplier may be capable of assembling accounting data associated with labor statistics involved in the production of a given product, and the like.

As described above, any given supplier may provide life cycle inventory data to the data hub 105 either as raw business or business transaction data, or as structured life cycle inventory data. Alternatively, a given supplier may provide life cycle inventory data to the data hub 105 in a combination of these two data provision methods. That is, a given supplier may possess sophisticated and detailed life cycle inventory data generated via its own processes or via its own ability to obtain such data, but such a supplier may also utilize one or more intermediate or end-user products in its processes for which it does not have such detailed life cycle inventory data. In such a case, the supplier may present structured life cycle inventory data via a template 220 for products for which it possesses such data, and the supplier may present raw business or business transaction data 215 via a unit process model template 225 for any intermediate or end-user products the supplier utilizes for which it does not have detailed life cycle inventory data.

Whether LCI data is provided by a supplier as structured LCI data or as raw business or business transaction data, for purposes of validating and auditing the data, as described below, certain data qualifiers may be required for each data item. For example, if the data item is for an automobile, the automobile may have been manufactured at one of three different plants utilized by the manufacturer, each of which may have built the particular model at a different time, using different power sources (e.g., nuclear power versus hydroelectric versus wind power), and using different parts (e.g., different batteries from different battery suppliers, depending on plant location). Thus, for LCI data provided for such a product, the data hub and associated systems (e.g., validation/auditing function) may require data qualifiers, such as date/time of manufacture, location of manufacture, parts differentiation based on location, and the like. That is, information for some products/services may require versioning to account for such data differences for products bearing the same model identification.

Referring still to FIGS. 2A, 2B, once life cycle inventory data is received from a given supplier, the data may be passed through a data validation and auditing function 230. The data validation function 230 may validate data received by a given supplier to determine whether the information received by the supplier is correct for the type of information received. For example, if a supplier provides information that it has utilized a certain number of metric tons of hydroelectric power where hydroelectric power is utilized in terms of kilowatt-hours as opposed to metric tons, the validation function may notify the supplier and ultimately may reject the data if the supplier does not correct the information it has provided. As should be appreciated, other types of validation may be performed, for example, where information provided by a supplier for a given intermediate or end-user product includes component specifications not recognized in comparison to any other similar products.

The auditing function 230 may compare received data against other similar types of data to determine whether the received data appears to be accurate in comparison with other similar types of data. For example, if a given supplier presents life cycle inventory data for a pesticide showing that the pesticide has certain toxicity levels beneath a desired threshold for toxicity, the data auditing function 230 may compare that information with toxicity levels known for other pesticides of the same pesticide type, for example, pesticides having the same or similar chemical make-ups and/or structures. If the information provided by the supplier, for example, the toxicity levels for a given pesticide, is out of range with other similarly utilized products, the auditing function 230 may notify the providing supplier and may reject the information.

After life cycle inventory data is received, validated, and audited, the data may be aggregated and scored for a given product by the data aggregation and scoring function 235. That is, a score associated with an environmental and/or social impact for the given product may be generated for presentation to requesting suppliers who may desire to use a product as an intermediate or end-user product. For example, if an environmental impact scoring system rates environmental impact of a given product on a range from zero to 100, and if a given product receives an environmental impact score of 60, a consumer of the product may choose another product receiving a higher environmental impact score. For more information on the aggregation and scoring of received and collected life cycle inventory data, see United States patent application, titled "Aggregation of Life Cycle Impact Assessment Data and Generation of Life Cycle Impact Assessments and Scoring," Ser. No. 13/228,327, filed Sep. 8, 2011, which is incorporated herein by reference as if fully set out herein.

After life cycle inventory data is aggregated and scored, the data may be passed through another auditing function 240 for comparing life cycle assessment scoring for the associated product with other similarly situated or types of products. The life cycle assessment scoring information may be stored in a storage repository 245, and ultimately the life cycle assessment information may be released through a release access point 250. According to an embodiment, the data release access point 250 may allow suppliers to obtain life cycle inventory data and life cycle assessment data for one or more products by accessing the data hub 105 via the secure framework 205.

As should be appreciated, in addition to life cycle assessment scoring generated for one or more life cycle inventory items, suppliers may request life cycle inventory data that has been received from other suppliers and that has passed through the data validation and auditing function 230. That is, before life cycle inventory data is aggregated and scored, or apart from aggregation and scoring, one or more other suppliers may request and receive life cycle inventory (LCI) data for one or more products. For example, the second crops grower 125 may request through the secure framework 205 life cycle inventory data provided by the first crops grower 120 to assist the second crops grower 125 in modifying its crops growing processes to include a modification of the life cycle inventory components or processes it uses.

As described below, release of such LCI data from one particular supplier to another supplier may present business, security or competition risks to the releasing supplier. Thus, according one embodiment, requested LCI data may be provided to a requesting supplier 125 in aggregate as a mean and median for comparative purposes without explicit authorization (other than being in the data hub to begin with), provided the data hub has sufficient aggregation of data to make data anonymous. For example, if the second crops grower desires LCI data for fuel usage by other similar crops growers, the requesting supplier may be provided with an average LCI data for fuel usage across a number of similar crops growing operations. If the data hub has access to only one data point, and provision of a mean or median or other statistically significant data type for the requested information is not available, then provision of the requested data may be restricted.

For example, if certain information provided by a given supplier, for example, the first crops grower 120, is proprietary in nature, for example, a proprietary combination of one or more intermediate products used in the production of an end-user product, then such information may be secured from access by another supplier. According to embodiments, a given supplier may indicate that certain life cycle inventory information is proprietary, and upon approval by the data hub 105, such life cycle inventory information may not be released to other requesting suppliers. For example, if a certain combination of components is proprietary in nature, the combination of the components may not be released to other requesting suppliers, but information on individual components may be released to requesting suppliers.

Referring still to FIGS. 2A, 2B, additional components and/or processes associated with the life cycle inventory and assessment hub 105 are illustrated. As described above with reference to FIGS. 2A, 2B, structured LCI data obtained either via the template 225 utilized by a supplier in association with or from a unit process model requested by the supplier or structured LCI data received directly from the supplier via the LCI data template 220 are passed to the data validation/auditing function 230 for validating the data against similar data to ensure that the data received is proper in terms of its intended use (e.g. metric tons versus kilowatt-hours), and the received structured LCI data is audited to ensure the accuracy of the data in comparison to other similar types of data.

As illustrated in FIGS. 2A, 2B, between the templates 220, 225 and the data validation/auditing function 230, metadata application components may be positioned for applying and/or retrieving metadata applied to received LCI data that may be used downstream for identifying, storing, searching and retrieving received LCI data. The metadata application 226 is illustrative of a software component and related process step with which metadata may be applied to LCI data received from a supplier via the template 225 for applying metadata to each received LCI data item. For example, as described below with reference to FIG. 5, for each data item received, for example, fuel data, pesticide data, fertilizer data, and the like from a given supplier, a variety of metadata items may be applied to identify each data item for downstream use of the data items. That is, metadata may be applied to each received item so that subsequent processes may sort the data, store the data, retrieve the data and use the data in the generation of life cycle assessment scoring for products containing components or processes associated with each of the received data items.

The received metadata 227 is illustrative of metadata applied to the LCI data received via the LCI data template 220 automatically when the data was populated into the template by the data supplier/provider. For example, if a sophisticated supplier of LCI data uses a structured data template for providing LCI data on one or more products or components of one or more products, entry of the required data, for example, fuel types used, dates of fuel usage, amounts of fuel usage, and the like, entry of the data into the fields of the structured data template 220 may result in the automatic application of metadata to each entered data item so that the data items may be stored, sorted, searched, and retrieved in association with downstream processing.

The parser 228 is a software application module operative to parse metadata applied to LCI data for allowing each metadata item to be stored in an appropriate location in association with the metadata storage repository 229. As should be appreciated, individual data items may be stored in a variety of storage repositories, and the metadata items applied to each such data item and stored in the storage repository 229 may be utilized by a downstream process, for example, the validation and auditing function 230, for locating a given data item. For example, a metadata item applied to a given LCI data item such as fuel type may serve as an identification for the actual fuel type data item. Storage of the metadata item associated with the actual data item may be used by downstream processing modules, for example, the data validation and auditing function 230, for locating the actual data item using the stored metadata item. For example, if a stored metadata item identifies a fuel type used in a given product, a downstream processing module may use the stored metadata item for locating the actual data item, for example, the fuel type associated with a given product, and for obtaining information about the data item, for example, information about the utilized fuel type.

Figure 3:
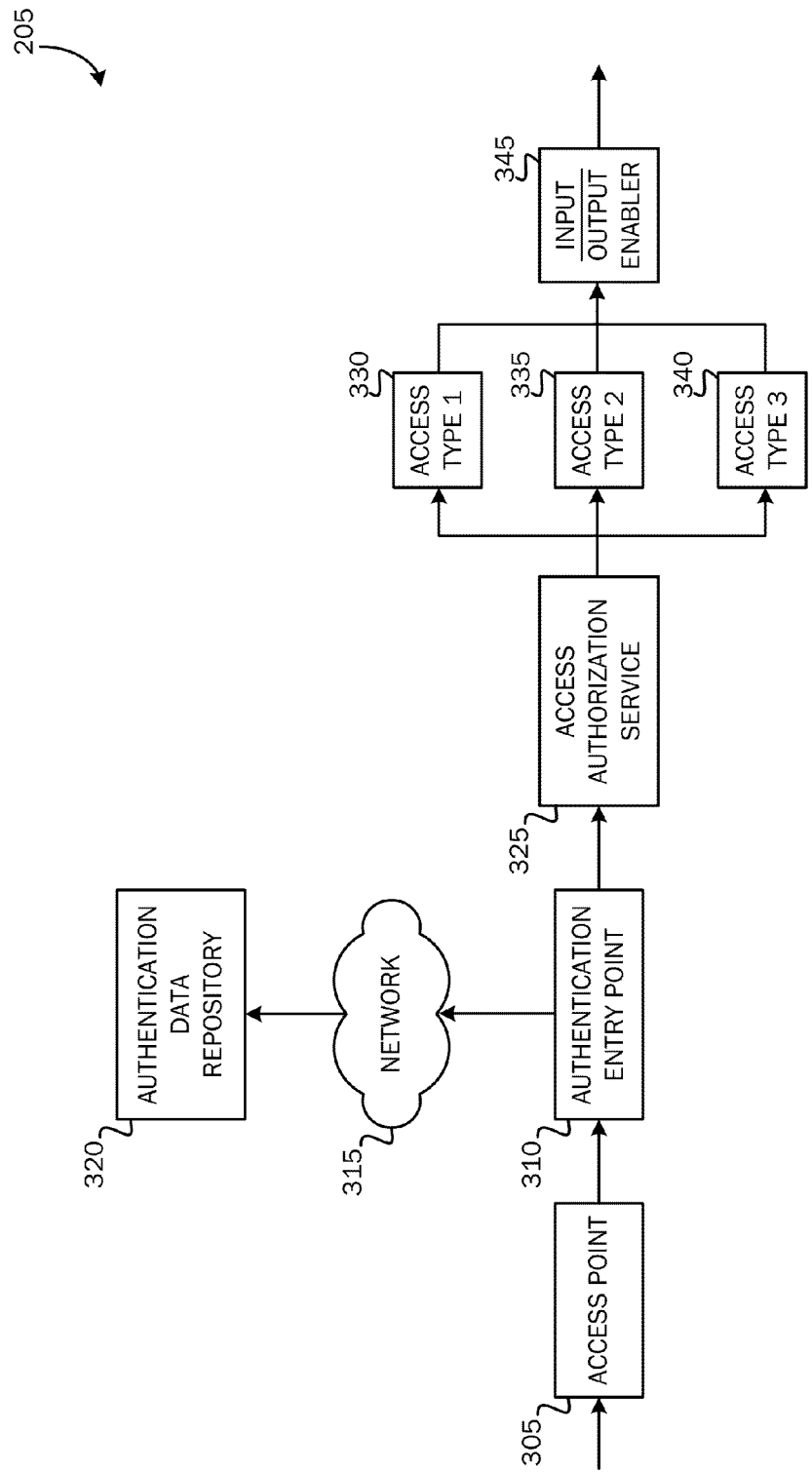
FIG. 3 is a simplified block diagram of a life cycle inventory input/output security framework.

Referring now to FIG. 3, as described above, a security framework 205 may be operated between suppliers and the data hub 105 and between one supplier and another supplier to secure data provided to and received from the data hub 105 from unauthorized access. The system architecture illustrated in FIG. 3 is one example of a security framework system architecture, but is not limiting of a vast number of security frameworks that may be employed for securing access to data provided to and retrieved from the data hub 105.

An access point 305 is illustrative of one or more access points with which a supplier may gain access to the data hub 105. According to one embodiment, the access point 305 may operate as a web services platform through which a supplier may access the data hub 105 through an Internet-based web page. The access point 305 likewise may operate according to a variety of other telecommunications-based access points to allow a supplier computing device to obtain access to the computing devices and/or storage repositories of the data hub 105.

An authentication entry point 310 is illustrative of a software application module operative to obtain authentication information from a supplier and to pass the authentication information to an authentication data repository 320 via a distributed computing network 310 or to a local authentication data repository 320 for obtaining authentication information. For example, the authentication entry point 310 may provide a dialog box to a requesting supplier requiring that a requesting supplier enter a password or other authenticating information for determining whether the requesting supplier may have access to data contained in the data hub 105. Once the authentication entry point 310 receives requested authentication information from the supplier, the authentication entry point may obtain authentication information for the requesting supplier from the authentication data repository 320. The access authorization service 325 may compare information received by the requesting supplier with information stored for the requesting supplier to determine whether the requesting supplier may have access to the computing systems and data of the data hub 105.

If the requesting supplier is granted an access privilege for access to the data hub 105, one or more access types 330, 335, 340 may be granted to the requesting supplier. For example, a first access type 330 may allow the supplier to provide LCI data and to request and receive LCI data associated with its own products only. A second access type 335 may allow the supplier to enter or provide LCI data and may allow the supplier to request LCI data for its own products as well as for a specified group of other products. A third access type 340 may specify a limited access by a requesting supplier of certain types of data, but may specify certain other types of data to which the supplier may not obtain access. For example, as described above, certain information contained and processed by the data hub 105 may include proprietary information, for example, specific combinations of components used by another supplier for achieving a desired result. The access authentication service 325 may grant an access type to a requesting supplier that restricts the requesting supplier from such proprietary data. The input/output enabler 345 is a software application operative to allow the requesting supplier to input LCI data and to receive LCI data in accordance with the access type granted to the requesting supplier.

As described above, suppliers may provide life cycle inventory data either as raw business or business transaction data in association with a unit process model, or suppliers may provide detailed life cycle inventory data according to a structured data template for use by the data hub 105. Referring to FIG. 4, the raw LCI data input document 410 may include a document of various types, for example, a word processing document or spreadsheet application document, with which a supplier may provide life cycle inventory information associated with a given product. For example, data 415 may be provided such as fuels data, power type and consumption data, materials data, production numbers, for example, bales of cotton produced during a given period, sales information, and the like. According to embodiments, a certain degree of data structuring may be required for the raw LCI data input document 310 in order for the associated data to be transformed by the data hub. For example, data headings or data metadata applied to various provided data points may be required to allow use of the data by the data hub 105, as described herein.

As described above, the raw business or business transaction data may be provided to the data hub 105 by a given supplier if the given supplier lacks the ability to provide the data in any structured manner, or according to a requested unit process model. Raw business or business transaction data received via a document 410 may then be automatically parsed and inserted into appropriate fields of a unit process model template or life cycle inventory data input template 420, described below.

The template 420 is illustrative of a structured data template with which a supplier may provide detailed life cycle inventory information where such information is available to the supplier. According to one embodiment, the template 420 may be obtained via a unit process model requested by a supplier and may contain fields for entering specific information about life cycle inventory data, for example, specific information about fuel types and usage, power usage specifications and consumption rates, materials and components information, production specifications, sales specifications, and the like. Thus, a supplier who has the ability to provide detailed LCI data may utilize the template 420 without the need for requesting a unit process model for providing LCI data to the data hub 105.

Figure 5:
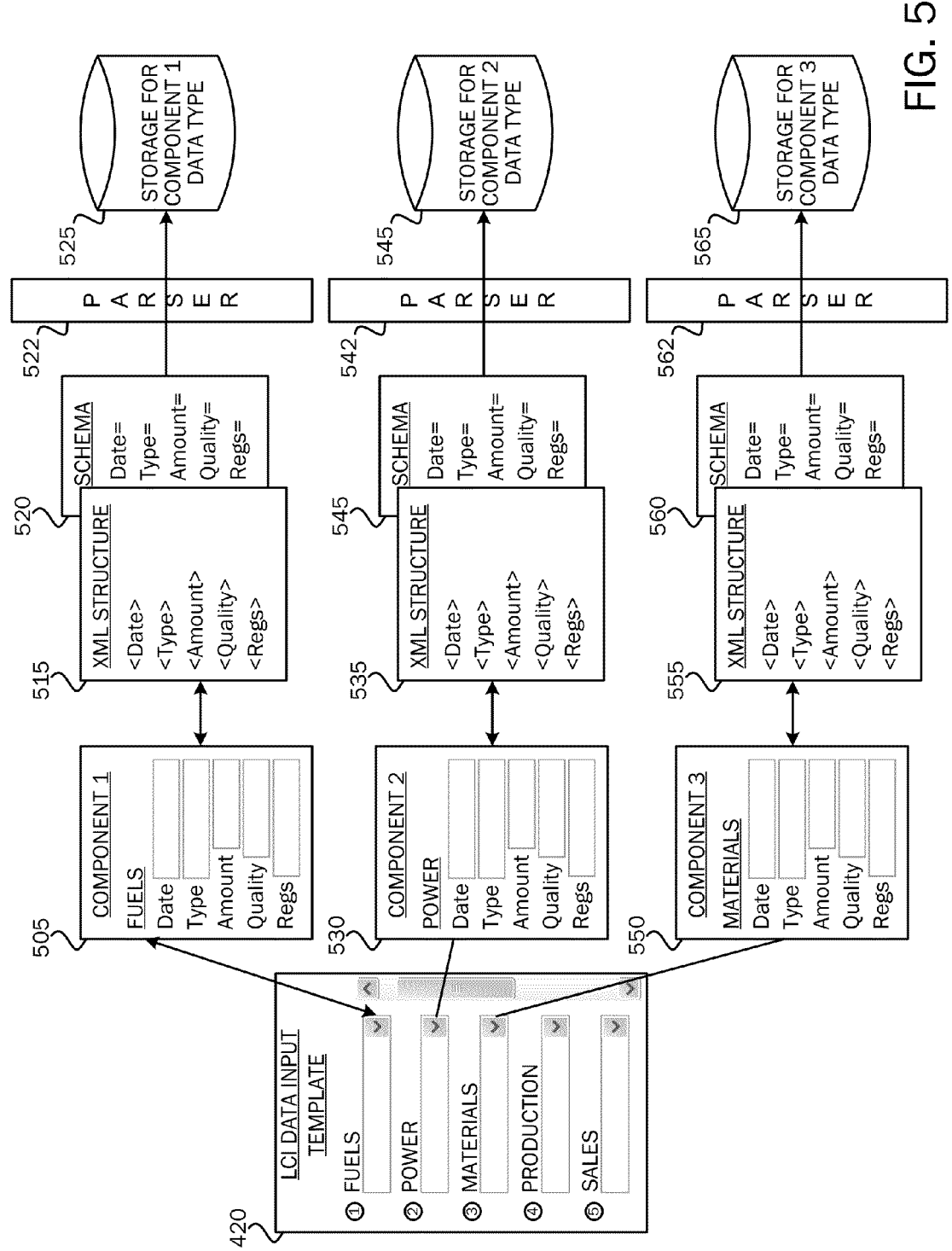
FIG. 5 is a simplified block diagram illustrating application and management of metadata associated with life cycle inventory data items.

FIG. 5 is a simplified block diagram illustrating application and management of metadata associated with life cycle inventory data items. As described above, suppliers of life cycle inventory data that may be ultimately used by other suppliers/requesters of life cycle inventory data and that may be used in the generation of life cycle assessment scores for products and/or components of products may be received from suppliers of information via a structured data template 420, described above with reference to FIG. 4. The structured data template 420 may be in the form of a structured data template provided by the supplier of life cycle inventory data in a first instance, or the structured data template 420 may be provided by a supplier after the supplier requests a unit process model in association with other similar LCI data and with which the supplier may enter LCI data so that the LCI data may be structured for downstream use.

Once a structured data template 420 is received containing LCI data, metadata may be applied to and/or extracted from the structured data template 420, as briefly described above with respect to FIGS. 2A, 2B. That is, if the structured data template 420 is received from a sophisticated provider of LCI data that has the capability of providing a full LCI data set via an LCI data set template 220, all required metadata may be applied to various LCI data items by use of the full set LCI data template 220 by the supplier. On the other hand, if the information provided by an unsophisticated supplier of LCI data is provided via a unit business process model requested by the supplier of LCI data, then additional metadata application may be required in order for efficient management and utilization of components of the LCI data in downstream processes.

For example, if LCI data presented by a crops grower utilizing a full data set LCI template 220, individual data items, for example, date of fuel purchase, amount of fuel purchase, type of fuel purchased, durations of fuel usage, and the like may have been entered by the supplier in a structured data template 220, and the metadata may be applied to each of these types of data so that each of these types of data may be identified, stored, sorted, searched and retrieved by downstream processes. Alternatively, if metadata has not been applied to each data item and each information item associated with each data item, for example, date of fuel usage associated with a fuel data item, then application of such metadata may be automatically applied to the data by the metadata application process 226, described above with reference to FIGS. 2A, 2B.

Referring still to FIG. 5, the structured LCI data template 420 having applied metadata, either initially applied by the supplier, or applied for the supplier via the metadata application process 226, is illustrated. For each data item contained in the structured data template 420, a metadata file 505, 530, 550, and so on may be generated by extracting metadata associated with each data item contained on the structured data template by the parser 228, illustrated in FIGS. 2A, 2B above. That is, the parser 228 is a software application module operative to parse the data items contained in the received structured data template 420 for obtaining additional data items or sub-data items associated with each main data item provided in the structured data template 420.

Referring to the data file 505, for the fuels component illustrated in the structured data template 420, a variety of additional data items or sub-data items are extracted by the parser 228. For example, a date of fuel purchase, a fuel type, an amount of fuel, a quality associated with the fuel, and any regulatory information associated with the fuel are extracted from data entered by the supplier via the structured data template 420. That is, each of these additional data items or sub-data items associated with the main fuels data item may be extracted from the structured data template 420 owing to the application of metadata for each of these additional data items or sub-data items that identify each of the additional or sub-data items individually.

The data file 530 is illustrative of additional data items or sub-data items associated with a second LCI data item provided by the supplier of the structured data template 420, for example, power or other utilities associated with the product for which the structured data template 420 is provided. A third data file 550 is illustrated containing similar additional data items or sub-data items for a third LCI data item or component (e.g., raw materials) provided by the supplier via the structured data template 420. As should be appreciated, data files 505, 530, 550 are illustrative of a variety of data items that may be associated with received LCI data and that may be extracted from a received LCI data template by the parser 228 for use in downstream processing, including the generation of life cycle assessment scoring for a given product.

Referring still to FIG. 5, according to embodiments, the metadata applied to individual LCI data items, for example, fuel, materials, transportation, distribution, and the like and the metadata associated with additional data items or sub-data items underneath each of those LCI data items, for example, data of fuel purchase, amount of fuel used, type of fuel used, and the like, may be structured according to a structured data language. One example structured data language is the Extensible Markup Language (XML), but as should be appreciated, XML is only one example of a structured data language with which individual data items may be structured to assist in storing, sorting, searching, retrieving, and utilization of data items to which one or more metadata items have been applied in association with a structured data language.

Example structured data files 515, 535, 555 are illustrated in association with the data files 505, 530, 550 showing markup tags that may be applied to each data item for structuring the data item and metadata associated with the data item to allow the data item and the associated metadata item to be stored, sorted, searched, retrieved and utilized. For example, a markup tag of <date> may be applied to both a data item comprising the actual date of an example fuel purchase and may be applied to a metadata item associated with an actual data item showing a date of the example fuel purchase such that the metadata item may be used for locating and retrieving the actual date of the example fuel purchase. As should be appreciated, the example structured data illustrated in the files 515, 535, 555 is not intended as an illustration of a well-formed structured data language file, but is intended for purposes of illustration only.

Behind each structured data file 515, 535, 555 may be included a structured data schema file 520, 540, 560 that may be associated with each of the respective structured data files for providing definition of the structured data markup tags applied to each data item and each associated metadata item. That is, the structured data schema files provide definition to any downstream parsing application capable of consuming and reading structured data markup in association with an attached or related structured data schema file to allow the parser to identify individual data items in a given data item file 505, 530, 550 so that individual data items may be stored, sorted, searched, retrieved, and utilized.

The parsers 522, 542, 562 are illustrative of parsing applications capable of reading the data files 505, 530, 550 in association with the structured data markup 515, 535, 555 applied to data items, additional data items, and sub-data items contained in the received data item files. The parsers 522, 542, 562 are further operative to store each received data item in a storage repository 525, 545, 565 associated with data items of the same or similar type. For example, data items received for fuels used by an example supplier and the associated metadata applied to the data items and sub-data items, for example, date of fuel usage, fuel type, amount of fuel usage, and the like that are structured according to a structuring language, for example, structured data, may be extracted from the file, and may be stored in a storage repository 525 associated with data received from other suppliers for data of the type "fuels." Similarly, data illustrated in the data file 535 for power usage may be stored in a data repository 545 along with information from other suppliers related to the data type "power."

As should be appreciated, such a data repository 525, 545, 565 may be established for containing various data items of various data item types and/or metadata associated with such various data items for provision to requesters of life cycle inventory information, or for use in the generation of life cycle assessment scores. For example, a subsequent product supplier may request life cycle inventory data regarding a variety of fuels with certain characteristics in order to decide which type or types of fuel would best meet its needs. Metadata associated with previously stored data items for fuel types and fuel usages of other suppliers may be used for searching life cycle inventory data associated with fuels from the storage repository 525 to provide to the requesting supplier.

For another example, during a validation and/or auditing process, described above with reference to FIGS. 2A, 2B, fuel information received by a product supplier may be compared with other similar fuel information previously stored in the data repository 525 to determine whether the LCI data provided by the supplier for fuels is valid and accurate as compared with fuel information previously received from other suppliers and stored in the data repository 525. As should be appreciated, the data stored in the data repositories 525, 545, 565 may be metadata only that may be used for locating associated actual data items, for example, actual data items related to fuel usages, that are stored in other storage repositories remote from the storage repositories 525, 545, 565, illustrated in FIG. 5.

Figure 6:
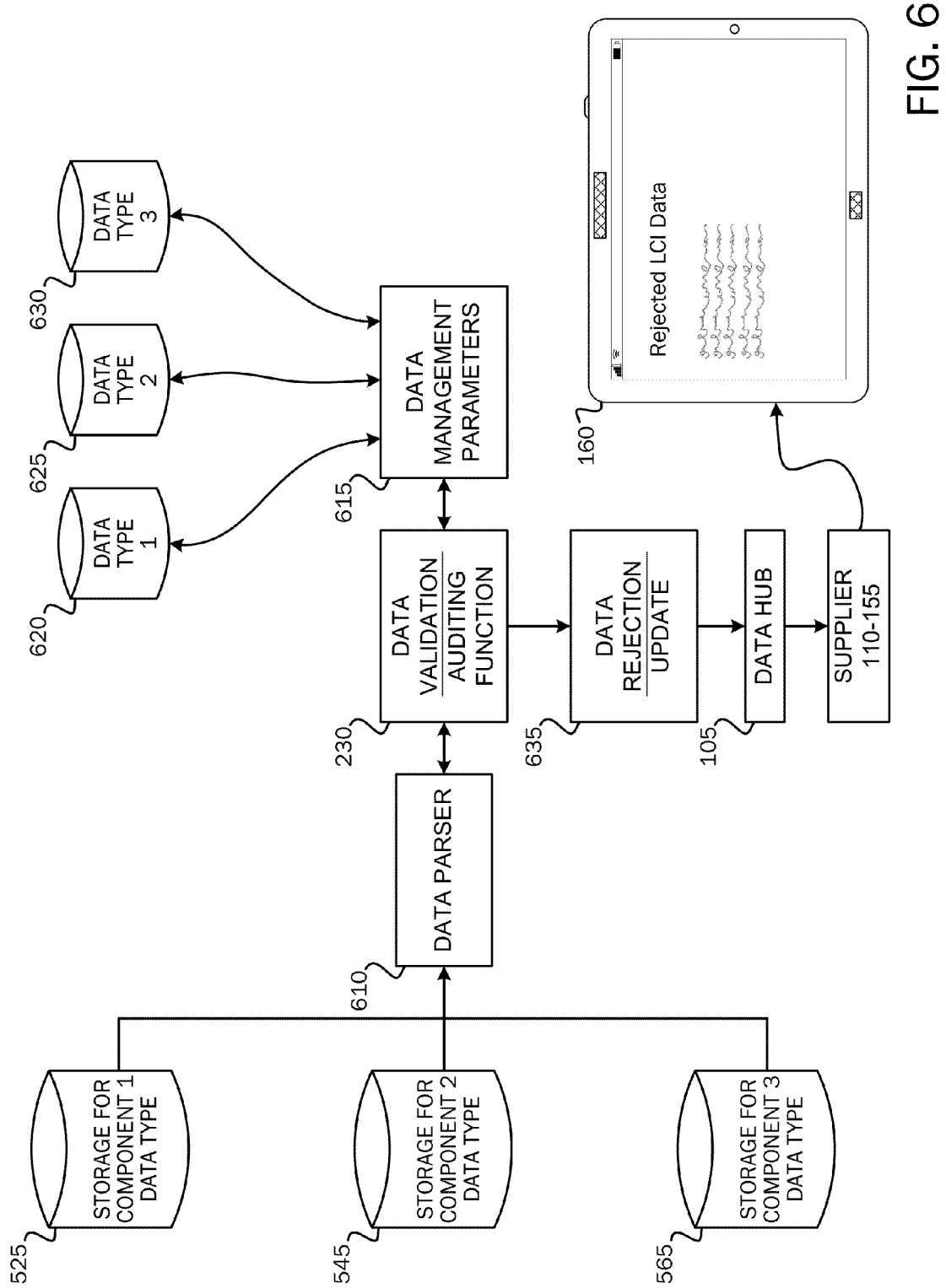
FIG. 6 is a simplified block diagram of a system architecture for parsing stored metadata associated with life cycle inventory data items and for comparing stored metadata with one or more data management parameters.

FIG. 6 is a simplified block diagram of a system architecture for parsing stored metadata associated with life cycle inventory data items and for comparing stored metadata with one or more data management parameters. As described above, after LCI data is provided to the data hub 105 as either raw data or as structured data, the data hub 105 may validate and audit the received data to determine whether the received data may be utilized in a data aggregation and scoring process, described above. The data repositories 525, 545 and 565, described above, may be queried by the data validation and auditing function 230 via the parser 610. That is, the data items and/or metadata items for received LCI data may be retrieved from the data repositories via the applied metadata and structuring described above with reference to FIG. 5.

For each data item retrieved via the data repositories 525, 545, 565, the data validation/auditing function 230 compares the received LCI data items to one or more data management parameters 615 to determine whether the data items received by the supplier contain sufficient information for a validation and auditing analysis of the received data. For example, if a supplier provided LCI data via a structured template 420, as described above, the validating function 230 may review the received data and compare the received data to similarly received data sets to determine whether enough data has been presented to allow for further use and analysis of the received data. Such received data sets to which the LCI data may be compared may be located in the storage repositories 620, 625, 630 according to data types, for example, fuels, iron ore, timber, utilities, etc. For example, if given data item contains only a partial identification of a fuel usage rate, a determination may be made that an insufficient amount or type of data has been received to allow for further analysis. That is, a data management parameter 615 may be used to instruct the validation function 230 that the example fuel usage rate data must include particular types of values in order to retrieve similar data from the storage repository 620, 625, 630 for further validation and auditing.

If a determination is made for a given data item processed by the validation and auditing function 230 that enough and appropriate types of information have been received for the given data item, the data item may be audited by comparing the information to data provided by other suppliers according to similar processes. For example, if the LCI data item received by the validation and auditing function 230 is associated with labor used in crop production, the LCI data item may be compared with labor data provided by other suppliers in association with crop production.

After a received data item is validated as an appropriate life cycle inventory item, the data item may be audited for accuracy by the validation and auditing function 230. If a significant deviation exists between the received LCI data item and other similar product/process LCI data items, auditing may not proceed. As should be appreciated, deviation thresholds may be set for various types of products or components of products to aid in the analysis of whether received data does or does not deviate significantly from similar product/process LCI data. For example, toxicity levels associated with a given pesticide or fertilizer may exist in a certain range of toxicity levels for pesticides or fertilizers used in similar processes. If LCI data for a pesticide or fertilizer product is received showing a toxicity level outside the range of normal toxicity levels, then a determination may be made that the data deviates too significantly from similar data for similar products/processes, and the data item may be rejected as a valid LCI data item as described below.

If not enough information is received, or if inaccurate information is received such that the received data fails the validation operation, described above, or if the LCI data received deviates significantly from similar LCI data for similar products/processes (i.e., fails the auditing operation), then the data item may be rejected from use by other suppliers or from use in the generation of a life cycle assessment score for the product to which the data item is associated. A data rejection/update notification 635 may be automatically provided to the supplier/provider of LCI data showing that the data received is insufficient, invalid, or is otherwise not acceptable. According to one embodiment, an automatic notification may be passed to the supplier/data provider to indicate those aspects of the received data that must be corrected or enhanced. For example, if a supplier provides usage data for hydroelectric power usage in terms of metric tons of usage as opposed to in terms of kilowatt-hours of usage, a notification may be provided to the supplier to correct the usage terms and to resubmit the LCI data.

Notifications may be made to the suppliers 110-155 via the data hub 105, and the notifications may be presented to the suppliers via the security framework 205. Such data item rejection notifications may be received, processed and responded to via the supplier computing device 160, as illustrated in FIG. 6. On the other hand, if the validated/audited data item is not rejected, it may be stored for provision to requesting suppliers and/or customers via the security framework 205, and the data item may be used in the generation of a life cycle assessment score for the product to which the data item is associated. As should be appreciated, each step of the validation and auditing process illustrated and described with reference to FIG. 6 may be accomplished by locating and passing data items from one processing step to another via the metadata and data structuring applied to LCI data items and managed, as described herein.

Figure 7:
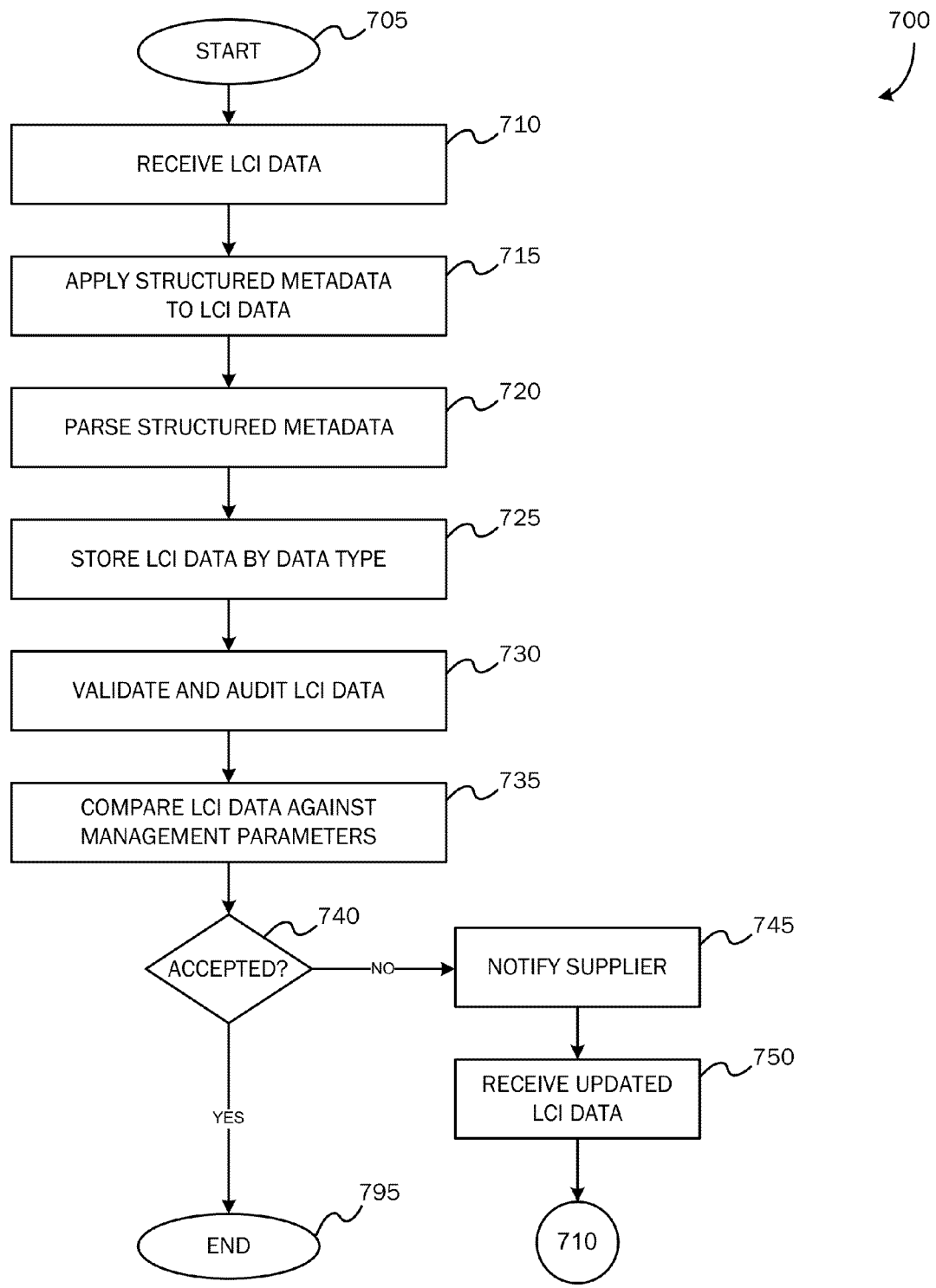
FIG. 7 is a flowchart illustrating a method for managing metadata for life cycle inventory and life cycle assessment data.

Having described a system architecture for receiving and processing LCI data through the use of metadata applied to LCI data items and sub-data items for storing, sorting, searching, retrieving, and using LCI data items, FIG. 7 is a flowchart illustrating a method for managing metadata for life cycle inventory and life cycle assessment data. The routine 700 begins as start operation 705 and proceeds to operation 710 where LCI data is received from one or more product suppliers for one or more components and/or processes associated with a given product, for example, the production of cotton for downstream clothing production.

At operation 715, structured metadata may be applied to each data item received by the product supplier, for example, date of purchase, amount of purchase, amount used, quality, regulatory identification information, and the like for a given product component, for example, fuel usage by farm machinery used in crops production. For example, structured metadata may be applied to the LCI data as structured data-based markup, as described above with reference to FIG. 5.

At operation 720, the structured metadata applied to the received LCI data may be parsed for extracting individual data items and for storing the individual data items in association with other similar data items provided by other suppliers of LCI data. At operation 725, metadata associated with individual LCI data items is used for storing or identifying storage locations of individual LCI data items by data item type. For example, all data items associated with fuels and fuel usages may be stored together as one data item type, all data items associated with power and/or other utilities associated with the production of various products may be stored together, LCI data associated with various materials, for example, data items representing raw materials, pesticides, fertilizers, chemicals, timber, mined ores, and the like may be stored with other similar data items. At operation 730, LCI data received from an LCI data supplier may be validated and audited, as described above with reference to FIG. 6. That is, the validation and auditing function 230 may utilize metadata applied to one or more received LCI data items to search for other similar LCI data items for validating and auditing the received LCI data items in accordance with one or more data management parameters at operation 735. For example, a given LCI data item, such as fuel, may be tagged with a metadata property that may be used for finding a variety of management parameters associated with a data item matching the metadata property. For example, one management parameter may include data ranges for carbon monoxide levels associated with combustion of various types of fuels, another management parameter may include toxicity levels associated with various types of fuels, and the like. Still other management parameters may include basic terms such as acceptable quantity types associated with various fuels.

These various management parameters may be stored and may be parsed for use by the validation and auditing function. For example, if an LCI item marked with a fuels metadata tag and a diesel fuel sub-tag is received from an information supplier, the fuels metadata tag and the diesel fuel sub-tab may be used by the validation and auditing function to locate a toxicity parameter for diesel fuel as well as acceptable quantity types for diesel fuels. If the actual submitted data includes syntax that does not meet the requirements of the acceptable quantity types, for example, where the fuel is submitted in terms of tons of fuel instead of gallons, liters or pounds, then the unacceptable syntax associated with the submission may cause the validation and auditing function to reject the submitted data as invalid data.

On the other hand, even if the submitted data meets acceptable data syntax or other similar parameters, the data may fail an auditing function where the data falls outside an acceptable range for some prescribed data attribute. For example, if a toxicity level supplied for a quantity of diesel fuel falls outside an acceptable range obtained from a database of toxicity ranges by parsing the database with a toxicity metadata tag applied to the supplied data, then the supplied data may be rejected for failing the auditing function.

At decision operation 740, if a given LCI data item is accepted in terms of the validation and/or auditing function, the received LCI data item may be stored for subsequent use, and the routine ends at operation 795. Alternatively, if a given LCI data item is rejected as being an invalid data item or where the received LCI data item is not considered an accurate LCI data item based on an audit of the LCI data item by the auditing function 230, the routine proceeds to operation 745, and the supplier of the rejected LCI data item may be notified.

At operation 750, an updated LCI data item may be received from a supplier of the rejected LCI data item, and the routine may proceed back to operation 710 for a validation and/or auditing of the LCI data item as made possible by the application of metadata to the LCI data item and to any additional data items or sub-data items associated with the received updated data item. The routine ends at operation 795.

Figure 8:
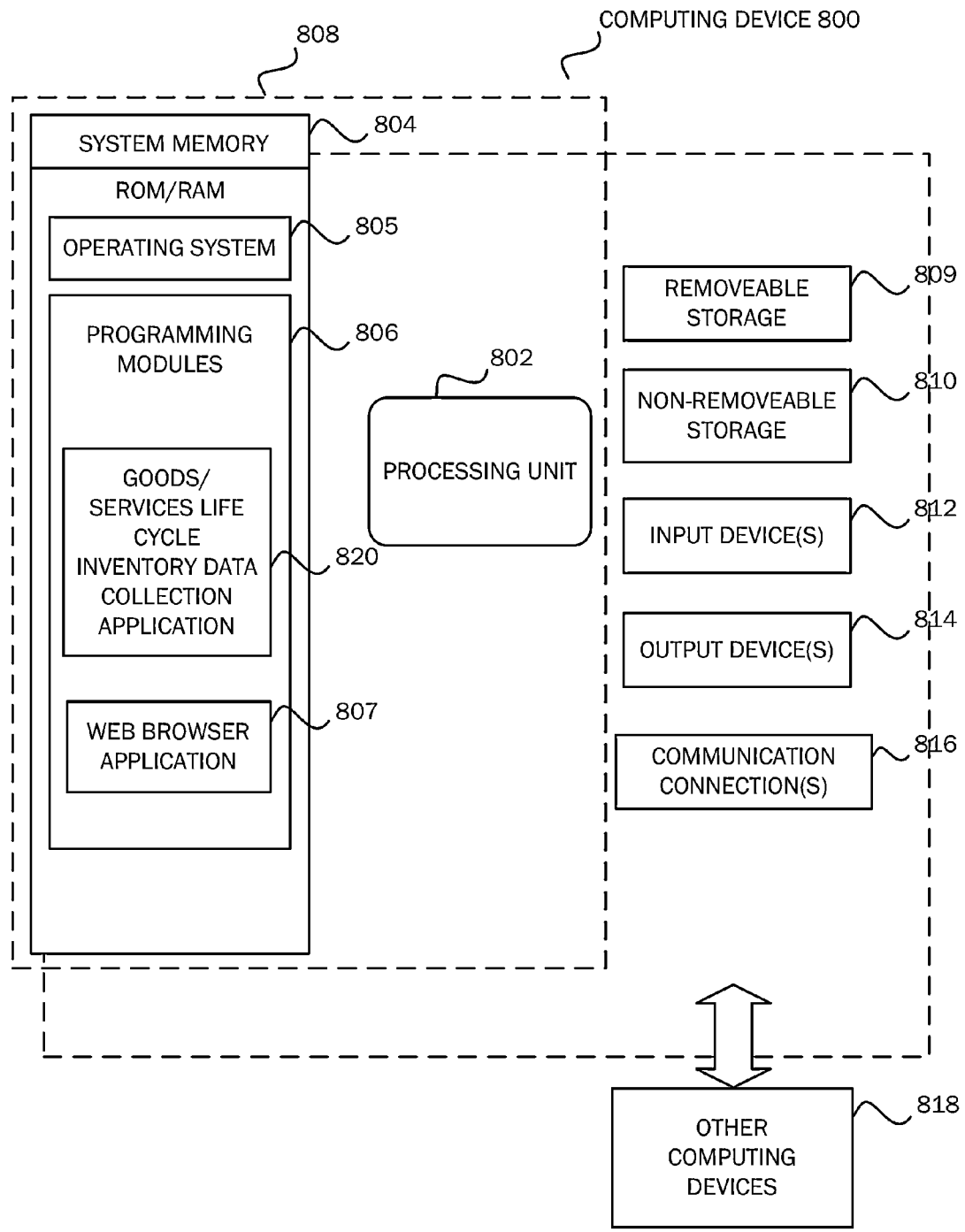
FIG. 8 is a simplified block diagram of a computing device with which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating example physical components of a computing device 800 with which embodiments of the invention may be practiced. The computing device components described below may be suitable for the computing devices described above, for example, the computing device 160. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination. System memory 804 may include operating system 805, one or more programming modules 806, and may include the comments application 820. Operating system 805, for example, may be suitable for controlling computing device 800's operation. Furthermore, embodiments of the invention may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810.

As stated above, a number of program modules and data files may be stored in system memory 804, including operating system 805. While executing on processing unit 802, programming modules 806, such as the life cycle inventory and assessment application 820 may perform processes including, for example, one or more of the stages of methods 500, 600 and/or 700. The aforementioned process is an example, and processing unit 802 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the life cycle inventory and assessment application 820 may be operated via application-specific logic integrated with other components of the computing device/system 800 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, etc. Output device(s) 814 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
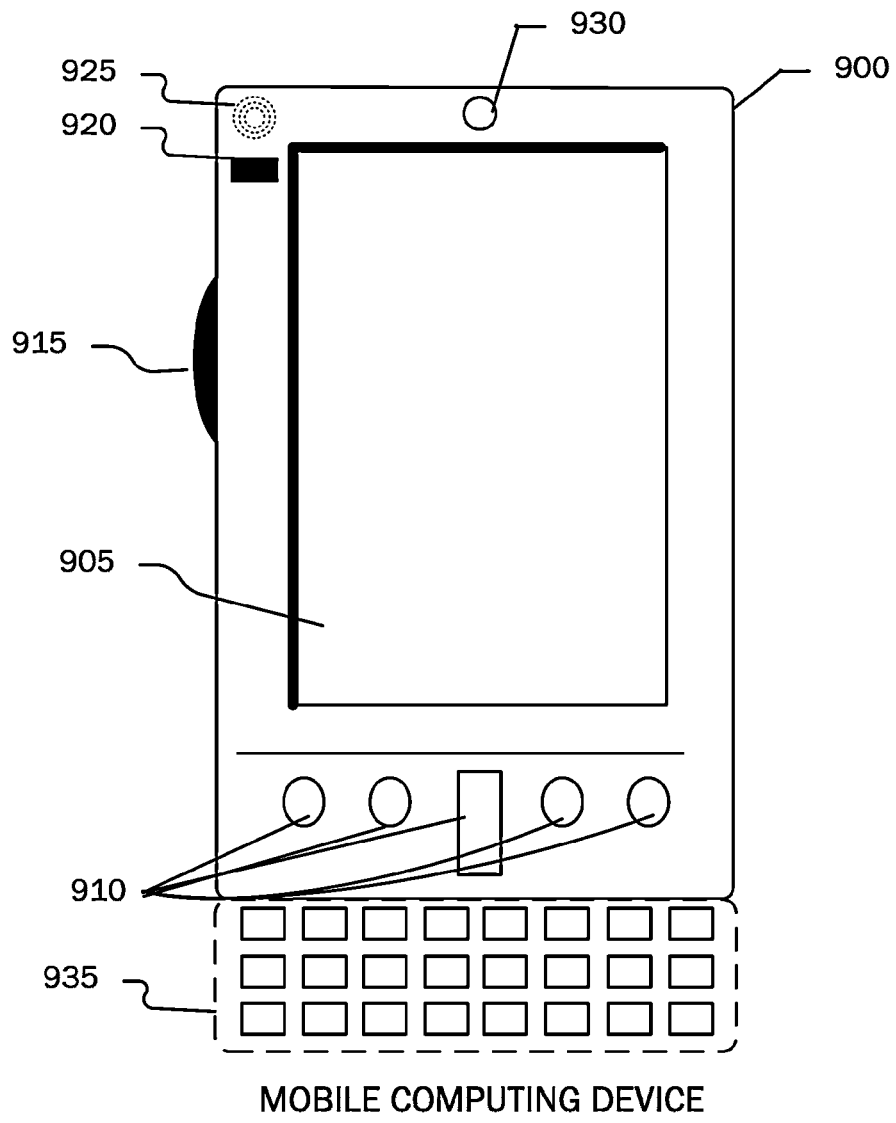
FIGS. 9A and 9B are simplified block diagrams of a mobile computing device with which embodiments of the present invention may be practiced.
Figure 9B:
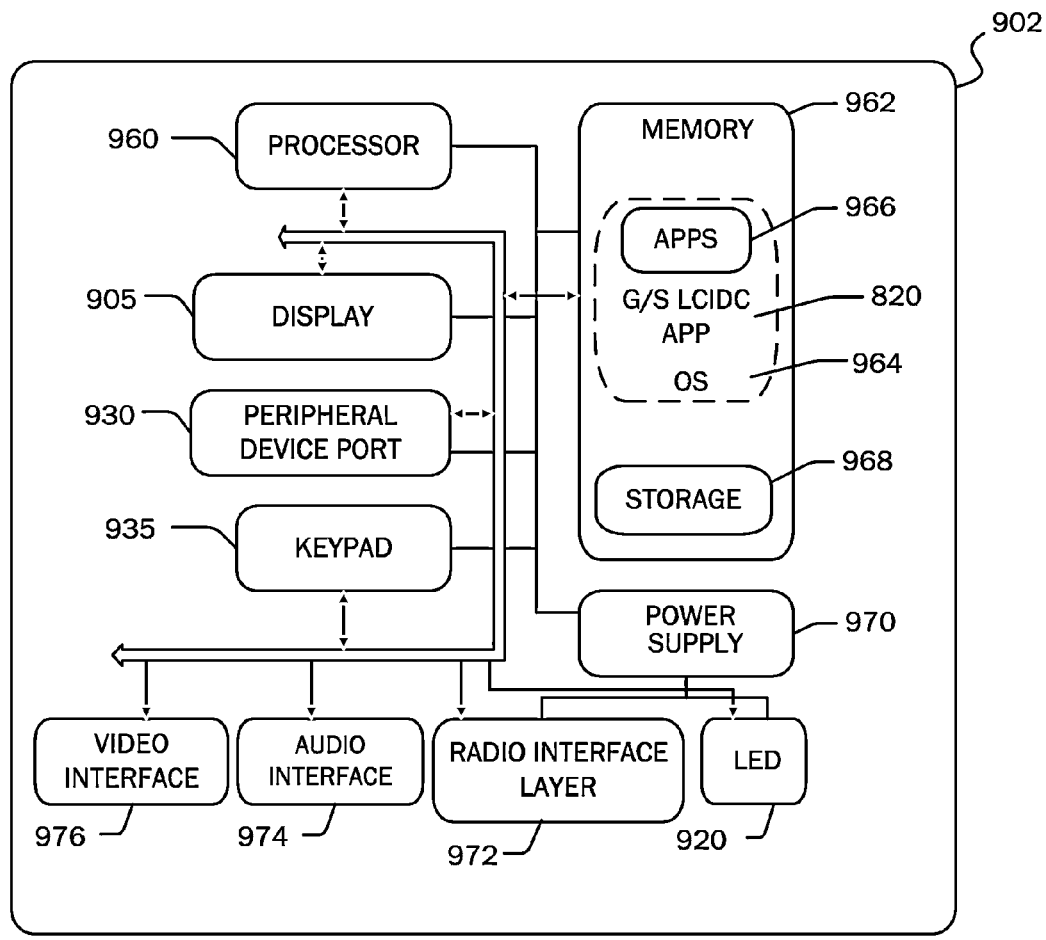
Figure 10:
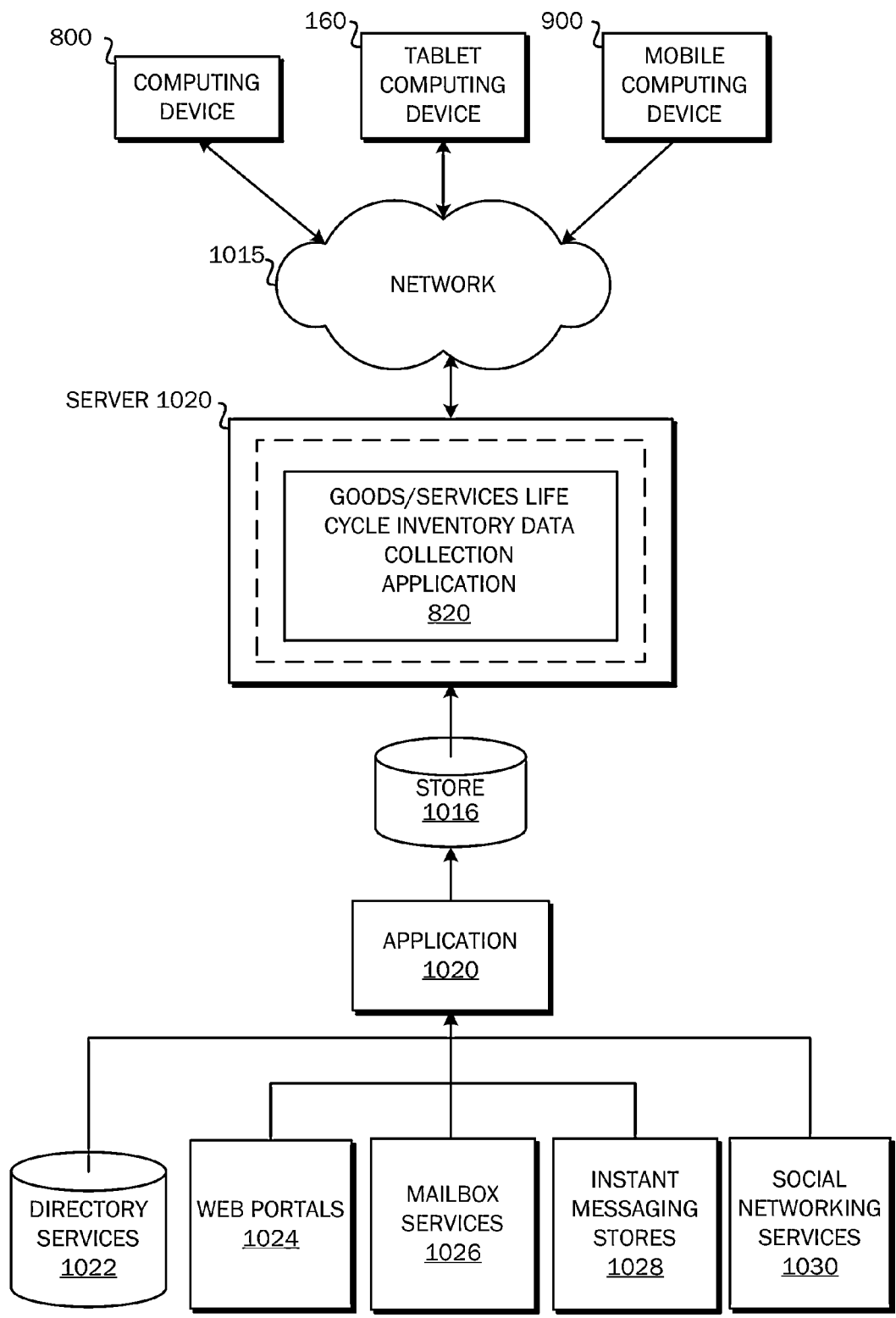
FIG. 10 is a simplified block diagram of a distributed computing system in which embodiments of the present invention may be practiced.

FIGS. 9A and 9B illustrate a suitable mobile computing environment, for example, a mobile telephone 900, a smart phone, a tablet personal computer, a laptop computer, and the like, with which embodiments of the invention may be practiced. With reference to FIG. 9A, an example mobile computing device 900 for implementing the embodiments is illustrated. In a basic configuration, mobile computing device 900 is a handheld computer having both input elements and output elements. Input elements may include touch screen display 905 and input buttons 915 that allow the user to enter information into mobile computing device 900. Mobile computing device 900 may also incorporate an optional side input element 915 allowing further user input. Optional side input element 915 may be a rotary switch, a button, or any other type of manual input element. In alternative embodiments, mobile computing device 900 may incorporate more or less input elements. For example, display 905 may not be a touch screen in some embodiments. In yet another alternative embodiment, the mobile computing device is a portable phone system, such as a cellular phone having display 905 and input buttons 915. Mobile computing device 900 may also include an optional keypad 935. Optional keypad 915 may be a physical keypad or a "soft" keypad generated on the touch screen display.

Mobile computing device 900 incorporates output elements, such as display 905, which can display a graphical user interface (GUI). Other output elements include speaker 925 and LED light 920. Additionally, mobile computing device 900 may incorporate a vibration module (not shown), which causes mobile computing device 900 to vibrate to notify the user of an event. In yet another embodiment, mobile computing device 900 may incorporate a headphone jack (not shown) for providing another means of providing output signals.

Although described herein in combination with mobile computing device 900, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 9B is a block diagram illustrating components of a mobile computing device used in one embodiment, such as the computing device shown in FIG. 9A. That is, mobile computing device 900 can incorporate system 902 to implement some embodiments. For example, system 902 can be used in implementing a "smart phone" that can run one or more applications similar to those of a desktop or notebook computer such as, for example, browser, e-mail, scheduling, instant messaging, and media player applications. In some embodiments, system 902 is integrated as a computing device, such as an integrated personal digital assistant (PDA) and wireless phone.

One or more application programs 966 may be loaded into memory 962 and run on or in association with operating system 964. Examples of application programs include phone dialer programs, e-mail programs, PIM (personal information management) programs, word processing programs, spreadsheet programs, Internet browser programs, messaging programs, and so forth. System 902 also includes non-volatile storage 968 within memory 962. Non-volatile storage 968 may be used to store persistent information that should not be lost if system 902 is powered down. Applications 966 may use and store information in non-volatile storage 968, such as e-mail or other messages used by an e-mail application, and the like. A synchronization application (not shown) also resides on system 902 and is programmed to interact with a corresponding synchronization application resident on a host computer to keep the information stored in non-volatile storage 968 synchronized with corresponding information stored at the host computer. As should be appreciated, other applications may be loaded into memory 962 and run on the device 900, including the life cycle inventory and assessment application 820, described herein.

System 902 has a power supply 970, which may be implemented as one or more batteries. Power supply 970 might further include an external power source, such as an AC adapter or a powered docking cradle that supplements or recharges the batteries.

System 902 may also include a radio 972 that performs the function of transmitting and receiving radio frequency communications. Radio 972 facilitates wireless connectivity between system 902 and the "outside world", via a communications carrier or service provider. Transmissions to and from radio 972 are conducted under control of OS 964. In other words, communications received by radio 972 may be disseminated to application programs 966 via OS 964, and vice versa.

Radio 972 allows system 902 to communicate with other computing devices, such as over a network. Radio 972 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 902 is shown with two types of notification output devices; LED 920 that can be used to provide visual notifications and an audio interface 974 that can be used with speaker 925 to provide audio notifications. These devices may be directly coupled to power supply 970 so that when activated, they remain on for a duration dictated by the notification mechanism even though processor 960 and other components might shut down for conserving battery power. LED 920 may be programmed to remain on indefinitely until the user takes action to indicate the powered-on status of the device. Audio interface 974 is used to provide audible signals to and receive audible signals from the user. For example, in addition to being coupled to speaker 925, audio interface 974 may also be coupled to a microphone to receive audible input, such as to facilitate a telephone conversation. In accordance with embodiments of the present invention, the microphone 820 may also serve as an audio sensor to facilitate control of notifications, as will be described below. System 902 may further include video interface 976 that enables an operation of on-board camera 930 to record still images, video stream, and the like.

A mobile computing device implementing system 902 may have additional features or functionality. For example, the device may also include additional data storage devices (removable and/or non-removable) such as, magnetic disks, optical disks, or tape. Such additional storage is illustrated in FIG. 9B by storage 968. Computer storage media may include volatile and nonvolatile, removable and non-removable media implemented in any method or technology for storage of information, such as computer readable instructions, data structures, program modules, or other data.

Data/information generated or captured by the device 900 and stored via the system 902 may be stored locally on the device 900, as described above, or the data may be stored on any number of storage media that may be accessed by the device via the radio 972 or via a wired connection between the device 900 and a separate computing device associated with the device 900, for example, a server computer in a distributed computing network, such as the Internet. As should be appreciated such data/information may be accessed via the device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates a system architecture for providing life cycle inventory and assessment data to one or more client devices, as described above. Content developed, interacted with or edited in association with a life cycle inventory and assessment application 820 may be stored in different communication channels or other storage types. For example, various LCI and LCA items along with information from which they are developed may be stored using directory services 1022, web portals 1024, mailbox services 1026, instant messaging stores 1028 and social networking sites 1030. The life cycle inventory and assessment application 820 may use any of these types of systems or the like for enabling data utilization, as described herein. A server 1020 may provide life cycle inventory and assessment data to clients. As one example, server 1020 may be a web server providing life cycle inventory and assessment data over the web. Server 1020 may provide life cycle inventory and assessment data over the web to clients through a network 1015. Examples of clients that may obtain content visualizations include computing device 800, which may include any general purpose personal computer, a tablet computing device 160 and/or mobile computing device 900 which may include smart phones. Any of these devices may obtain content from the store 1016.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of managing life cycle inventory and assessment data for a product, comprising:

receiving one or more data items for a first product, each of the one or more data items being associated with one or more metadata items;

parsing the one or more data items for identifying each of the one or more data items by the one or more metadata items;

separating each of the one or more data items in association with the one or more metadata items;

storing each of the separated one or more data items in one or more data repositories corresponding to one or more data types associated with each of the one or more data items;

retrieving each of the one or more data items from a corresponding data repository by a metadata items associated with each retrieved one or more data items;

validating the retrieved one or more data items as life cycle inventory items to be used for generation of a life cycle assessment score for the first product, wherein validating the retrieved one or more data items to determine if the retrieved one or more data items may be accepted as life cycle inventory data items includes comparing the one or more retrieved one or more data items with one or more parameters associated with other data items accepted as the life cycle inventory data items of a similar data item type as the retrieved one or more data items to determine whether the retrieved one or more data items may be accepted as the life cycle inventory data items for the first product, wherein comparing the one or more retrieved one or more data items with one or more parameters associated with other data items accepted as life cycle inventory data items of a similar data item type includes comparing one or more attributes of the retrieved one or more data items with one or more corresponding attributes of the other data items accepted as the life cycle inventory data items of the similar data item type as the retrieved one or more data items for the first product;

if the retrieved one or more data items may be accepted as the life cycle inventory data items for the first product, accepting the retrieved one or more data items as the life cycle inventory data items for the first product; and updating the one or more metadata items associated with each of the retrieved one or more data items accepted as the life cycle inventory data items to indicate the life cycle inventory data items may be used to generate the life cycle assessment score for the first product.

2. The method of claim 1, wherein receiving one or more data items for the first product includes receiving the one or more data items via a structured data template.

3. The method of claim 2, wherein receiving the one or more data items via the structured data template includes receiving the one or more data items via the structured data template having one or more data fields, wherein when a given data item is entered into any of the one or more structured data fields, the one or more metadata items are applied to the given data item with which the given item may be identified.

4. The method of claim 3, wherein receiving the one or more data items via the structured data template having the one or more data fields includes receiving the one or more data items via the structured data template having the one or more data fields structured according to structured data language.

5. The method of claim 1, prior to receiving one or more data items for the first product, providing a unit process model associated with one or more products of a type to which the first product is associated.

6. The method of claim 5, further comprising the unit process model providing one or more selectable structured data templates having on or more structured data fields for receiving the one or more data items for the first product, wherein when a given data item is entered into any of the one or more structured data fields, the one or more metadata items is applied to the given data item with which the given item may be identified.

7. The method of claim 1, wherein if the retrieved one or more data items are not accepted as the life cycle inventory data items, rejecting the retrieved one or more data items as the life cycle inventory data items for the first product.

8. The method of claim 7, further comprising notifying a supplier of the one or more data items that the one or more data items are rejected as the life cycle inventory data items for the first product and providing the supplier of the one or more data items for the first product one or more reasons for a rejection of the one or more data items as the life cycle inventory data items for the first product.

9. The method of claim 8, in response to notifying the supplier of the one or more data items that the one or more data items are rejected as the life cycle inventory data items for the first product, receiving a revised one or more data items for the first product for determining whether the received revised one or more data items for the first product may be accepted as the life cycle inventory data items for the first product.

10. The method of claim 1, wherein if the received one or more data items are not accepted as the life cycle inventory data items for the first product, auditing the received one or more data items to determine whether the received one or more data items may be accepted as the life cycle inventory data items for the first product where the received one or more data items include sufficient information to be categorized as the life cycle inventory data items for the first product.

11. The method of claim 1, wherein receiving one or more data items for the first product, each of the one or more data items being associated with the one or more metadata items, includes receiving one or more data items for the first product based on a versioning qualifier for each of the one or more data items where the versioning qualifier distinguishes one version of each of the one or more data items from other versions of each of the one or more data items.

12. The method of claim 1, wherein retrieving each of the one or more data items from a corresponding data repository by a metadata item associated with each retrieved one or more data item for validating the retrieved the one or more data items as the life cycle inventory data items that may be used for generation of the life cycle assessment score for the first product further includes retrieving each of the one or more data items for comparing the one or more data items with one or more data items received from a second product.

13. The method of claim 12, wherein retrieving each of the one or more data items for comparing the one or more data items with one or more data items received from the second product include retrieving each of the one or more data items for comparing the one or more data items with one or more data items received from the second product to determine whether the one or more data items received from the second product are valid data items that may be used for generation of the life cycle assessment score for the second product.

14. A computer readable memory storage device containing computer executable instructions which when executed by a computer performs a method of managing life cycle inventory and assessment data for a product, comprising:

receiving one or more data items for a first product via a structured data template, each of the one or more data items being associated with one or more metadata items;

parsing the one or more data items for identifying each of the one or more data items by the one or more metadata items applied to each of the one or more data items;

separating each of the one or more data items in association with the one or more metadata items;

storing each of the one or more data items in one or more data repositories corresponding to one or more data types associated with each of the one or more data items;

retrieving each of the one or more data items from a corresponding data repository by a metadata items associated with each retrieved one or more data items;

validating the retrieved one or more data items as life cycle inventory items to be used for generation of a life cycle assessment score for the first product, wherein validating the retrieved one or more data items to determine if the retrieved one or more data items may be accepted as life cycle inventory data items includes comparing the retrieved one or more data items with one or more parameters associated with other data items accepted as the life cycle inventory data items of a similar data item type as the retrieved one or more data items to determine whether the retrieved one or more data items may be accepted as the life cycle inventory data items for the first product, wherein comparing the one or more retrieved one or more data items with one or more parameters associated with other data items accepted as life cycle inventory data items of a similar data item type includes comparing one or more attributes of the retrieved one or more data items with one or more corresponding attributes of the other data items accepted as the life cycle inventory data items of the similar data item type as the retrieved one or more data items for the first product;

if the one or more data items may be accepted as the life cycle inventory data items for the first product, accepting the one or more data items as the life cycle inventory data items for the first product; and updating the one or more metadata items associated with each of the one or more data items accepted as the life cycle inventory data items to indicate the life cycle inventory data items may be used to generate the life cycle assessment score for the first product.

15. The computer readable memory storage device of claim 14, wherein receiving the one or more data items via a structured data template includes receiving the one or more data items via the structured data template having one or more data fields, wherein when a given data item is entered into any of the one or more structured data fields, the one or more metadata items is applied to the given data item with which the given item may be identified.

16. The computer readable memory storage device of claim 14, further comprising:

validating the one or more data items to determine if the one or more data items may be accepted as life cycle inventory data items for the first product;

if the one or more data items may be accepted as the life cycle inventory data items for the first product, accepting the one or more data items as the life cycle inventory data items for the first product; and updating the one or more metadata items associated with each of the one or more data items accepted as the life cycle inventory data items to indicate the accepted the life cycle inventory data items may be used to generate the life cycle assessment score for the first product.

17. A system for managing life cycle inventory and assessment data for a product, comprising:

a memory; and a processing unit that executes instructions stored on the memory to create:

a life cycle inventory and assessment data hub operative to receive one or more data items via a structured data template for a first product, each of the one or more data items being associated with one or more metadata items;

parse the one or more data items for identifying each of the one or more data items by the one or more metadata items;

separate each of the one or more data items in association with the one or more metadata items;

store each of the separated one or more data items in one or more data repositories corresponding to one or more data types associated with each of the one or more data items;

retrieve each of the one or more data items from a corresponding data repository by the one or more metadata items associated with each retrieved one or more data items;

validate the retrieved one or more data items to determine if the retrieved one or more data items may be accepted as the life cycle inventory data items that may be used for generation of the life cycle assessment score for the first product, wherein validating the retrieved one or more data items to determine if the retrieved one or more data items may be accepted as life cycle inventory data items includes comparing the retrieved one or more data items with one or more parameters associated with other data items accepted as the life cycle inventory data items of a similar data item type as the retrieved one or more data items to determine whether the retrieved one or more data items may be accepted as the life cycle inventory data items for the first product, wherein comparing the one or more retrieved one or more data items with one or more parameters associated with other data items accepted as life cycle inventory data items of a similar data item type includes comparing one or more attributes of the retrieved one or more data items with one or more corresponding attributes of the other data items accepted as the life cycle inventory data items of the similar data item type as the retrieved one or more data items for the first product;

accept the retrieved one or more data items as the life cycle inventory data items for the first product, if the retrieved one or more data items may be accepted as the life cycle inventory data items that may be used for generation of the life cycle assessment score for the first product; and update the one or more metadata items associated with each of the retrieved one or more data items accepted as the life cycle inventory data items to indicate the accepted the life cycle inventory data items may be used to generate the life cycle assessment score for the first product.

18. The system of claim 17, wherein receiving one or more data items via the structured data template for the first product includes receiving the one or more data items via the structured data template having one or more data fields, the given data item being entered into any of the one or more structured data fields, each of the one or more metadata items being applied to the given data item with which the given item may be identified.

19. The system of claim 17, prior to receiving one or more data items for the first product, providing a unit process model associated with one or more products of a type to which the first product is associated, the unit process model providing one or more selectable structured data templates having on or more structured data fields for receiving the one or more data items for the first product, wherein when a given data item is entered into any of the one or more structured data fields, the one or more metadata items is applied to the given data item with which the given item may be identified.

20. The method of claim 17, wherein if the one or more data items are not accepted as the life cycle inventory data items, rejecting the one or more data items as the life cycle inventory data items for the first product.

* * * * *